United States Patent
Matsuno et al.

(10) Patent No.: US 11,442,328 B2
(45) Date of Patent: Sep. 13, 2022

(54) OPTICAL DEVICE AND ELECTRONIC APPARATUS

(71) Applicant: Seiko Epson Corporation, Tokyo (JP)

(72) Inventors: Yasushi Matsuno, Matsumoto (JP); Teruyuki Nishimura, Matsumoto (JP)

(73) Assignee: Seiko Epson Corporation

( * ) Notice: Subject to any disclaimer, the term of this patent is extended or adjusted under 35 U.S.C. 154(b) by 159 days.

(21) Appl. No.: 16/583,397

(22) Filed: Sep. 26, 2019

(65) Prior Publication Data
US 2020/0103721 A1     Apr. 2, 2020

(30) Foreign Application Priority Data

Sep. 27, 2018 (JP) .............................. JP2018-181434
Dec. 20, 2018 (JP) .............................. JP2018-238108

(51) Int. Cl.
*G02F 1/21* (2006.01)

(52) U.S. Cl.
CPC ................ *G02F 1/21* (2013.01); *G02F 1/213* (2021.01)

(58) Field of Classification Search
CPC .. G02B 26/00; G02B 26/001; G02B 26/0841; G02B 5/20; G02B 5/28; G02B 5/285; G02B 5/284; G02F 1/21; G02F 1/213; G02F 1/03; G02F 1/07; G01J 3/12; G01J 3/28; G01J 3/2823; G01J 3/26; G01J 1/0271; G01J 1/0488; G01J 1/0214; G01J 2003/2826; G01J 2003/1247
USPC ......... 359/260, 290, 291, 223.1, 224.1, 578, 359/579, 589; 356/450, 454, 519, 506
See application file for complete search history.

(56) References Cited

U.S. PATENT DOCUMENTS

| | | | |
|---|---|---|---|
| 4,553,816 A | 11/1985 | Durand et al. | |
| 2002/0167730 A1* | 11/2002 | Needham | G02B 26/02 359/578 |
| 2013/0044377 A1 | 2/2013 | Nishimura et al. | |

FOREIGN PATENT DOCUMENTS

| | | |
|---|---|---|
| GB | 927477 A | 5/1963 |
| JP | S63-271322 A | 11/1988 |
| JP | 2012-108370 A | 6/2012 |

* cited by examiner

*Primary Examiner* — Jie Lei
(74) *Attorney, Agent, or Firm* — Harness, Dickey & Pierce, P.L.C.

(57) ABSTRACT

Provided is an optical device including a first wavelength variable interference filter in which a first reflective film and a second reflective film face each other with a first gap in between; a second wavelength variable interference filter in which a third reflective film and a fourth reflective film face each other with a second gap in between; and a first substrate having a transmissive property, which has a first surface and a second surface which is opposite in direction to the first surface, in which the second reflective film is provided on the first surface of the first substrate, and in which the third reflective film is provided on the second surface of the first substrate.

7 Claims, 16 Drawing Sheets

OPTICAL DEVICE AND ELECTRONIC APPARATUS

The present application is based on, and claims priority from, JP Application Serial Number 2018-181434, filed Sep. 27, 2018 and JP Application Serial Number 2018-238108, filed Dec. 20, 2018, the disclosures of which are hereby incorporated by reference herein in their entirety.

BACKGROUND

1. Technical Field

The present disclosure relates to an optical device and an electronic apparatus.

2. Related Art

In the related art, a light dispersion device (an optical device) through which light with a prescribed wavelength, of incident light is caused to pass is known (for example, refer to JP-A-2012-108370).

In the optical device that is disclosed in JP-A-2012-108370, a fixed mirror is positioned on a surface of a substrate, a movable mirror is positioned on the fixed mirror with a supporting member in between, and thus a first filter is configured. Then, a movable mirror of a second filter is brought into contact with the movable mirror of the first filter with a connection film in between, and a fixed mirror of the second filter is positioned on the movable mirror of the second filter with a supporting member in between.

In such an optical device, when light with a wavelength that is included in a band in which a light dispersion band for the first filter and a light dispersion band for the second filter overlap is dispersed, a gap between both the first filter and the second filter is set to a dimension in accordance with a light dispersion wavelength. Furthermore, when, with the optical device, light with a wavelength that is included in a band which does not overlap the light dispersion band for the second filter, of the light dispersion band for the first filter, is dispersed, only a gap with the first filter is set to the dimension in accordance with the light dispersion wavelength. In the same manner, when, with the optical device, light with a wavelength that is included in a band which does not overlap the light dispersion band for the first filter, of the light dispersion band for the second filter, is dispersed, only a gap with the second filter is set to the dimension in accordance with the light dispersion wavelength.

With such a configuration, a wavelength variable band in which the light dispersion is possible with the optical device ranges from the shortest wavelength in the light dispersion for the first filter to the longest wavelength in the light dispersion band for the second filter. Because of this, the wavelength variable band can be made to be a broad band compared with a case where the optical device is configured with only one Fabry-Perot filter.

However, in the optical device that is disclosed in JP-A-2012-108370, the movable mirror of the first filter and the movable mirror of the second filter are brought into contact with each other with a film-shaped connection in between. Because of this, optical multiple interferences occur between these movable mirrors. More precisely, the movable mirror of the first filter and the movable mirror of the second filter function as a third filter through which light with a wavelength in accordance with a thickness of the connection layer is caused to pass. In this case, the light with the wavelength in accordance with the thickness of the connection layer passes through the third filter, and because of this, can be caused to pass through the optical device at high transmittance by making the gap between the first filter and the second filter suitable for the wavelength. However, when a target wavelength is set to be any other wavelength, there occurs a problem in that transmittance of the third filter is decreased and in that an amount of light that passes through the optical device is reduced.

SUMMARY

An optical device according to a first application example includes a first wavelength variable interference filter in which a first reflective film and a second reflective film face each other with a first gap in between; a second wavelength variable interference filter in which a third reflective film and a fourth reflective film face each other with a second gap in between; and a first substrate having a transmissive property, which has a first surface and a second surface which is opposite in direction to the first surface, in which the second reflective film is provided on the first surface of the first substrate, and the third reflective film is provided on the second surface of the first substrate.

In the optical device according to the application example, the first wavelength variable interference filter may include a first electrode provided on the first reflective film and a second electrode provided on the second reflective film, the first electrode and the second electrode may face each other with the first gap in between, the second wavelength variable interference filter may include a third electrode provided on the third reflective film and a fourth electrode provided on the fourth reflective film, the third electrode and the fourth electrode may face each other with the second gap in between, the first substrate may include a first through-hole that passes through the first substrate from the first surface to the second surface, and one of the first electrode and the second electrode may conduct electricity to one of the third electrode and the fourth electrode through the first through-hole.

An optical device according to a second application example includes: a first wavelength variable interference filter in which a first reflective film and a second reflective film face each other with a first gap in between; a second wavelength variable interference filter in which a third reflective film and a fourth reflective film face each other with a second gap in between; a second substrate having a transmissive property, which includes a third surface and a fourth surface that is opposite in direction to the third surface, and a third substrate having the transmissive property, which includes a fifth surface and a sixth surface that is opposite in direction to the fifth surface, in which the second reflective film is provided on the third surface of the second substrate, the first reflective film is provided to be opposite in direction to the second substrate with the second reflective film in between, the fourth reflective film is provided on the fifth surface of the third substrate, the third reflective film is provided to be opposite in direction to the third substrate with the fourth reflective film in between, the fourth surface of the second substrate is fixed, with a spacer, with respect to the fifth surface of the third substrate, and the second wavelength variable interference filter is positioned between the second substrate and the third substrate.

In the optical device according to the application example, the first wavelength variable interference filter may include a first electrode provided on the first reflective film and a second electrode provided on the second reflective film, the first electrode and the second electrode may face each other with the first gap in between, the second wavelength variable interference filter may include a third electrode provided on the third reflective film and a fourth electrode provided on the fourth reflective film, the third electrode and the fourth electrode may face each other with the second gap in between, the spacer may be a conductive spacer having a conductive property, the second substrate may have a second through-hole that passes through the second substrate from the third surface to the fourth surface, in a position that is brought into contact with the conductive spacer, and one of the first electrode and the second electrode may conduct electricity to one of the third electrode and the fourth electrode through the second through-hole and the conductive spacer.

An optical device according to a third application example includes: a first wavelength variable interference filter in which a first reflective film and a second reflective film face each other with a first gap in between; a second wavelength variable interference filter in which a third reflective film and a fourth reflective film face each other with a second gap in between; a fourth substrate having a transmissive property, which has a seventh surface and an eighth surface that is opposite in direction to the seventh surface; and a fifth substrate having the transmissive property, which has a ninth surface and a tenth surface that is opposite in direction to the ninth surface, in which the first reflective film is provided on the eighth surface of the fourth substrate, the second reflective film is provided to be opposite in direction to the fourth substrate with the first reflective film in between, the fourth reflective film is provided on the ninth surface of the fifth substrate, the third reflective film is provided to be opposite in direction to the fifth substrate with the fourth reflective film in between, the eighth surface of the fourth substrate is fixed, with a spacer, with respect to the ninth surface of the fifth substrate, and the first wavelength variable interference filter and the second wavelength variable interference filter are arranged between the fourth substrate and the fifth substrate.

In the optical device according to the application example, the first wavelength variable interference filter may include a first electrode provided on the first reflective film and a second electrode provided on the second reflective film, the first electrode and the second electrode may face each other with the first gap in between, the second wavelength variable interference filter may include a third electrode provided on the third reflective film and a fourth electrode provided on the fourth reflective film, the third electrode and the fourth electrode may face each other with the second gap in between, the spacer may be a conductive spacer having a conductive property, and one of the first electrode and the second electrode may conduct electricity to one of the third electrode and the fourth electrode through the conductive spacer.

In the optical device according to any one of the first to third application examples, the first wavelength variable interference filter may be configured to change a dimension of the first gap and thus to make a first transmission wavelength, which is a wavelength of light that is caused to pass through the first wavelength variable interference filter, changed in a range from a first wavelength to a second wavelength that is longer in wavelength than the first wavelength, and the second wavelength variable interference filter may be configured to change a dimension of the second gap and thus to make a second transmission wavelength, which is a wavelength of light that is caused to pass through the second wavelength variable interference filter, changed in a range from a third wavelength that is longer in wavelength than the first wavelength and is shorter in wavelength than the second wavelength to a fourth wavelength that is longer in wavelength than the second wavelength.

In the optical device according to any one of the first to third application examples, a distance between the second reflective film and the third reflective film may be 300 times or more a center wavelength in a wavelength region from the first wavelength to the fourth wavelength.

In the optical device according to any one of the first to third application examples, a distance between the second reflective film and the third reflective film may be 30000 times or less a center wavelength in a wavelength region from the first wavelength to the fourth wavelength.

In the optical device according to any one of the first to third application examples, a distance between the second reflective film and the third reflective film may be longer than a distance between the first reflective film and the second reflective film and may be longer than a distance between the third reflective film and the fourth reflective film.

An electronic apparatus according to a fourth application example includes an optical device according to any one of the first and third application examples; and a control unit that controls the optical device.

BRIEF DESCRIPTION OF THE DRAWINGS

FIG. 3 is a diagram illustrating a transmission characteristic of a light dispersion unit, which appears when a second reflective film and a third reflective film are brought into contact with each other with a connection film in between.

FIG. 4 is a diagram illustrating the transmission characteristic of the light dispersion unit, which appears when the second reflective film and the third reflective film are brought into contact with each other with the connection film in between.

DESCRIPTION OF EXEMPLARY EMBODIMENTS

First Embodiment

A first embodiment will be described below.

Figure 1:
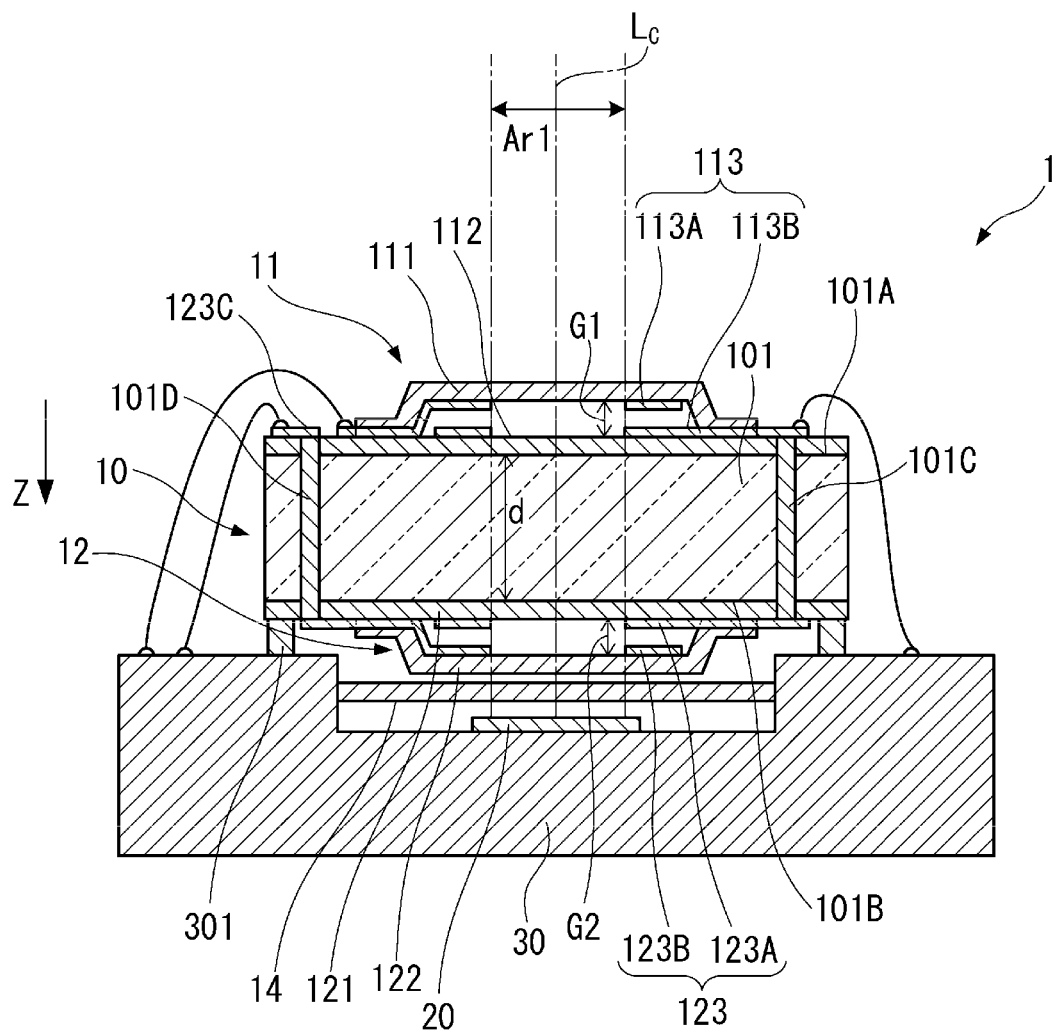
FIG. 1 is a cross-sectional diagram illustrating a schematic configuration of a spectrometric apparatus according to a first embodiment.

FIG. 1 is a cross-sectional diagram illustrating a schematic configuration of a spectrometric apparatus 1 according to the first embodiment.

Entire Configuration of the Spectrometric Apparatus 1

The spectrometric apparatus 1 is an electronic apparatus that disperse measuring light, which enters from a measuring target, and thus measures an optical spectrum, chromaticity, or the like of the measuring target. The spectrometric apparatus 1, as illustrated in FIG. 1, includes a light dispersion unit 10 that is an optical device, a light receiving unit 20 that detects light that results from dispersing by the light dispersion unit 10, and a circuit substrate 30 that holds the light dispersion unit 10 and the light receiving unit 20.

Configuration of the Light Dispersion Unit 10

The light dispersion unit 10, as illustrated in FIG. 1, is configured to include a first wavelength variable interference filter 11, a second wavelength variable interference filter 12, and a first substrate 101 on which the first wavelength variable interference filter 11 and the second wavelength variable interference filter 12 are provided.

The first substrate 101 is a parallel plate with a transmissive property, which includes a first surface 101A that the measuring light enters, and a second surface 101B that is opposite in direction to the first surface 101A. It is noted that the transmissive property here means having a transmittance having a prescribed value or higher for light in a wavelength region (a light dispersion-available band $\Delta\Lambda_0$) that is dispersible by the light dispersion unit 10. For example, when the light dispersion-available band $\Delta\Lambda_0$ is a visible light region, for configuration, the first substrate 101 is made of glass or the like that possibly transmits light in the visible light region. Furthermore, when the light dispersion-available band $\Delta\Lambda_0$ is from a near infrared region to an infrared region, for configuration, the first substrate 101 is made from an Si substrate or the like.

It is noted that a thickness dimension of the first substrate 101, more precisely, a distance d between two parallel plane surfaces, the first surface 101A and the second surface 101B will be described below.

The first wavelength variable interference filter 11 is provided to face the first surface 101A of the first substrate 101. The first wavelength variable interference filter 11 is a Fabry-Perot type wavelength variable interference filter and includes a first reflective film 111 and a second reflective film 112.

In the present embodiment, as the first reflective film 111 and the second reflective film 112, a dielectric multilayer film, which results from alternately stacking a low refractive optical layer and a high refractive optical layer on top of each other, is used. In such a dielectric multilayer film, layer-thicknesses of the low refractive optical layer and the high refractive optical layer are set, and thus a center wavelength in a reflection band can be set, and light can be reflected at high reflectance in a prescribed reflection band of which the center is the center wavelength. By using the first reflective film 111 and the second reflective film 112 that are configured as such a dielectric multilayer film, a first light dispersion band $\Delta\Lambda_1$, which is a range where light is dispersed by the first wavelength variable interference filter 11, can be easily designed. Furthermore, it is possible that light with a desired target wavelength is caused to pass through the first wavelength variable interference filter 11 at high resolution.

The second reflective film 112 is provided on the first surface 101A of the first substrate 101. More precisely, a surface of the second reflective film 112 is in parallel with the first surface 101A.

On the other hand, the first reflective film 111 is positioned to be opposite in direction to the first substrate 101 with the second reflective film 112 in between. Furthermore, edge portions of the first reflective film 111 are brought into contact with the second reflective film 112, a part of the center portion thereof faces the second reflective film 112 with a first gap G1 in between.

At this point, in the light dispersion unit 10 according to the present embodiment, when a direction from the first surface 101A of the first substrate 101 toward the second surface 101B is defined as a thickness direction Z of a substrate, the measuring light is incident in parallel with the thickness direction Z along a substrate center-axis $L_c$ that passes through the center of the first substrate 101. Then, of measuring lights that are incident, a light in a measuring area Ar1 that is in a prescribed diameter dimension range from the substrate center-axis $L_c$ is light-received by the light receiving unit 20.

In the first wavelength variable interference filter 11, the first reflective film 111 and the second reflective film 112 are maintained in parallel in the measuring area Ar1, and a dimension of the first gap G1 is uniform. Therefore, light with a first transmission wave in accordance with the dimension of the first gap G1 passes through the first wavelength variable interference filter 11.

Furthermore, the first wavelength variable interference filter 11 has a first gap changing unit 113 that changes the dimension of the first gap G1. The first gap changing unit 113 is configured with a first electrode 113A and a second electrode 113B.

The first electrode 113A is provided on a surface of the first reflective film 111, which faces the second reflective film 112, in a manner that surrounds the measuring area Ar1. More precisely, the first electrode 113A is positioned along an imaginary circle having a diameter dimension from the substrate center-axis $L_c$.

Furthermore, the second electrode 113B is provided on a surface of the second reflective film 112, which faces the first reflective film 111, in a manner that surrounds the measuring area Ar1. More precisely, the second electrode 113B is positioned along the imaginary circle having a diameter dimension from the substrate center-axis $L_c$. Then, the first electrode 113A and the second electrode 113B face each other between the first gap G1 in between.

In the first gap changing unit 113 with such a configuration, a drive voltage is applied between the first electrode 113A and the second electrode 113B, and thus electrostatic attraction occurs between the first electrode 113A and the second electrode 113B. Accordingly, the dimension of the first gap G1 changes, and according to the change in the dimension of the first gap G1, a wavelength (a first transmission wave) of light that passes through the measuring area Ar1 of the first wavelength variable interference filter 11 changes as well. In the present embodiment, the first wavelength variable interference filter 11 is configured to change the first gap G1 and thus to make a first transmission wavelength changeable in a range of the first light dispersion band $\Delta\Lambda_1$ from a first wavelength $\lambda_1$ to a second wavelength $\lambda_2$ ($\lambda_2 > \lambda_1$).

On the other hand, the second wavelength variable interference filter 12 is provided to face the second surface 101B of the first substrate 101. In the same manner as the first wavelength variable interference filter 11, the second wavelength variable interference filter 12 is a Fabry-Perot type wavelength variable interference filter and includes a third reflective film 121 and a fourth reflective film 122.

In the same manner as in the first wavelength variable interference filter 11, in the second wavelength variable interference filter 12, the third reflective film 121 and the fourth reflective film 122 each are configured as a dielectric multilayer film as well. For this reason, in the second wavelength variable interference filter 12, a thickness of each layer is set, and thus a second light dispersion band $\Delta\Lambda_2$, which is a range where light is dispersed by the second wavelength variable interference filter 12, can be easily designed and it is possible that the light with the desired target wavelength is caused to pass through at high resolution.

The third reflective film 121 is provided on the second surface 101B of the first substrate 101. Because the first surface 101A and the second surface 101B are in parallel with each other, the second reflective film 112 that is provided on the first surface 101A and the third reflective film 121 that is provided on the second surface 101B are in parallel with each other.

The fourth reflective film 122 is positioned to be opposite in direction to the first substrate 101 with the third reflective film 121 in between.

Furthermore, in the same manner as the first wavelength variable interference filter 11, edge portions of the fourth reflective film 122 are brought into contact with the third reflective film 121, a part of the center portion thereof faces the third reflective film 121 with a second gap G2 in between. In the second wavelength variable interference filter 12, the third reflective film 121 and the fourth reflective film 122 are maintained in parallel in the measuring area Ar1, and a dimension of the second gap G2 is uniform. Therefore, light with a second transmission wavelength in accordance with the dimension of the second gap G2 passes through the second wavelength variable interference filter 12.

Furthermore, the second wavelength variable interference filter 12 has a second gap changing unit 123 that changes the dimension of the second gap G2. The second gap changing unit 123 is configured with a third electrode 123A and a fourth electrode 123B.

The third electrode 123A is provided on a surface of the third reflective film 121, which faces the fourth reflective film 122, in a manner that surrounds the measuring area Ar1. The fourth electrode 123B is provided on a surface of the fourth reflective film 122, which faces the third reflective film 121, in a manner that surrounds the measuring area Ar1. Then, the third electrode 123A and the fourth electrode 123B face each other between the second gap G2 in between.

In the same manner as the first gap changing unit 113, the second gap changing unit 123 applies a drive voltage between the third electrode 123A and the fourth electrode 123B, and thus electrostatic attraction occurs between the third electrode 123A and the fourth electrode 123B. Accordingly, the dimension of the second gap G2 changes, and the second transmission wavelength, which is a wavelength of light that passes through the measuring area Ar1 of the second wavelength variable interference filter 12, changes as well. In the present embodiment, the second wavelength variable interference filter 12 is configured to change the second gap G2 and thus to make the second transmission wavelength changeable in the second light dispersion band $\Delta\Lambda_2$ from a third wavelength $\lambda_3$ ($\lambda_1 < \lambda_3 < \lambda_2$) to a fourth wavelength $\lambda_4$ ($\lambda_4 > \lambda_3 > \lambda_2$).

Furthermore, in the present embodiment, a first through-hole 101C and a wiring through-hole 101D, which passes through the first substrate 101 from the first surface 101A to the second surface 101B, are provided in the first substrate 101. It is noted that, as illustrated in FIG. 1, when the second reflective film 112 covers the entire first surface 101A, or when the third reflective film 121 covers the entire second surface 101B, the first through-hole 101C or the wiring through-hole 101D pass through the first substrate 101 from a surface of the second reflective film 112, which is opposite in direction to the first substrate 101, to a surface of the third reflective film 121, which is opposite in direction to the first substrate 101.

Then, one of the first electrode 113A and the second electrode 113B of the first gap changing unit 113 conduct electric current to one of the third electrode 123A and the fourth electrode 123B of the second gap changing unit 123 through the first through-hole 101C. In the present embodiment, as illustrated in FIG. 1, the second electrode 113B that is provided on the second reflective film 112 and the third electrode 123A that is provided on the third reflective film 121 conduct electricity to each other. The second electrode 113B and the third electrode 123A are electrically connected to a ground circuit provided on the circuit substrate 30 and are set to be at common electric potential.

It is noted that for configuration for a connection between the second electrode 113B and the third electrode 123A, the second electrode 113B and the third electrode 123A may be connected to each other by pouting a conductive member, such Ag paste, into the first through-hole 101C, and that the second electrode 113B and the third electrode 123A may be connected to each other by inserting a through-electrode into the first through-hole 101C.

The wiring through-hole 101D is a through-hole for conducting electricity between the fourth electrode 123B and a fourth electrode terminal 123C provided on the first surface 101A of the first substrate 101. That is, in the present embodiment, the second surface 101B of the first substrate 101 is fixed by fixation member 301 in such a manner as to face the circuit substrate 30, a gap between the first substrate 101 and the circuit substrate 30 is small, and wiring to the fourth electrode 123B is difficult. In contrast with this, through the wiring through-hole 101D, the fourth electrode 123B is connected to the fourth electrode terminal 123C provided on the first substrate 101, and thus a wiring operation can be easily performed.

Furthermore, in the light dispersion unit 10 according to the present embodiment, each of the first transmission wave that is a wavelength of light that passes through the first wavelength variable interference filter 11, and the second transmission wavelength that is a wavelength of light that passes through the second wavelength variable interference filter 12 is suitably set, and thus the light with the desired target wavelength that is included in the light dispersion-available band $\Delta\Lambda_0$ can be dispersed. On the other hand, for light out of a band that is the light dispersion-available band $\Delta\Lambda_0$, transmittance is high, and such light cannot be dispersed. Therefore, it is preferable that a cut filter 14 that blocks light with a wavelength out of the light dispersion-available band $\Delta\Lambda_0$ is provided in the light dispersion unit 10. A position in which the cut filter 14 is provided, if on an optical axis of the light receiving unit 20, is not particularly limited, and for example, as illustrated in FIG. 1, the cut filter 14 can be positioned between the second wavelength variable interference filter 12 and the light receiving unit 20.

Transmission Characteristic of the Light Dispersion Unit 10

Next, as described above, a transmission characteristic (a light dispersion characteristic) of the light dispersion unit 10 will be described.

Figure 2:
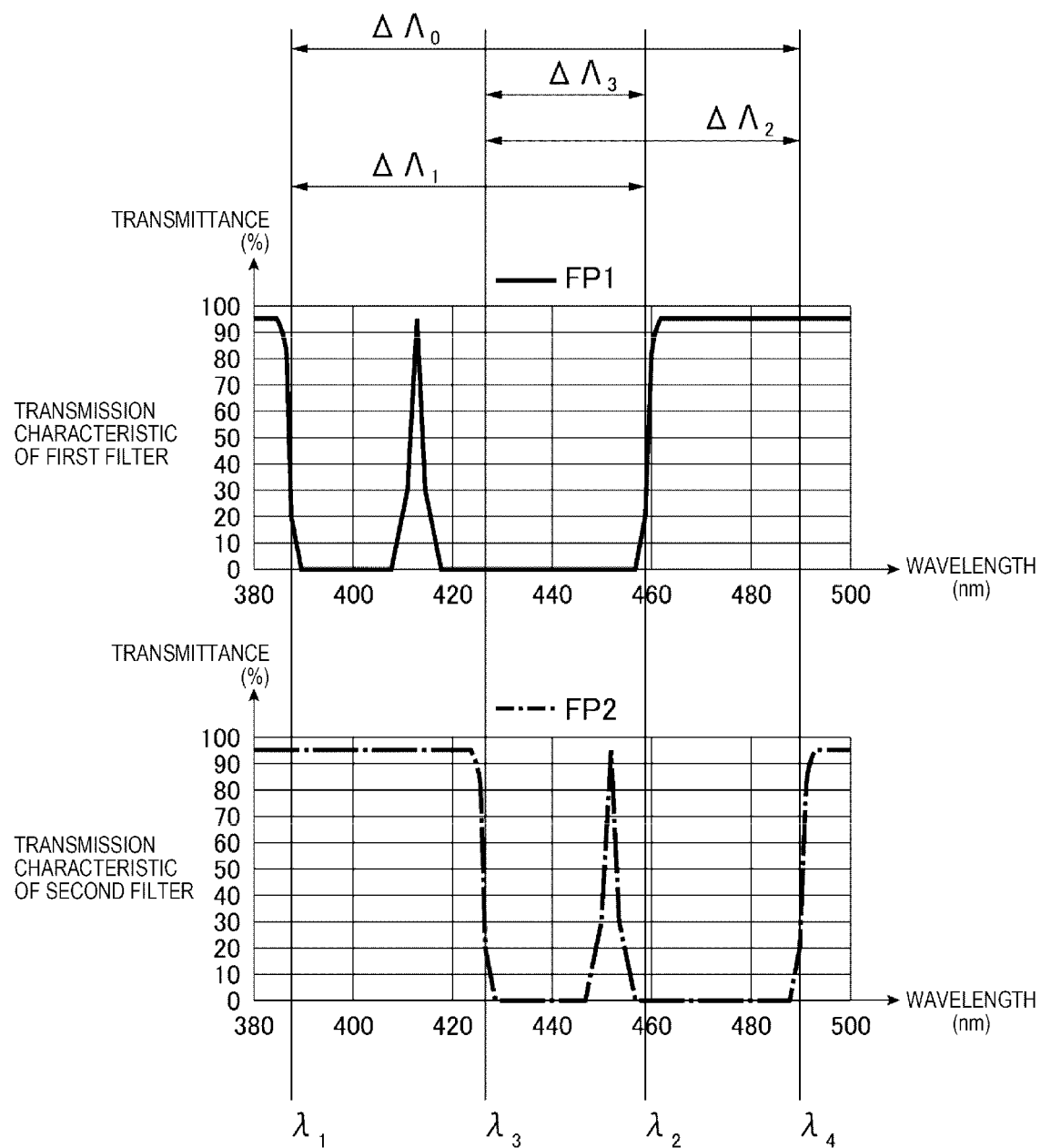
FIG. 2 is a diagram illustrating examples of transmission characteristics of a first wavelength variable interference filter and a second wavelength variable interference filter according to the first embodiment.

FIG. 2 is a diagram illustrating examples of transmission characteristics of the first wavelength variable interference filter 11 and the second wavelength variable interference filter 12 according to the present embodiment.

The first wavelength variable interference filter 11 changes the dimension of the first gap G1, and thus can change the first transmission wavelength in the first light dispersion band $\Delta\Lambda_1$ from the first wavelength $\lambda_1$ to the second wavelength $\lambda_2$.

Furthermore, the second wavelength variable interference filter 12 changes the dimension of the second gap G2, and thus can change the second transmission wavelength in the second light dispersion band $\Delta\Lambda_2$ from the third wavelength $\lambda_3$ to the fourth wavelength $\lambda_4$.

At this point, in the present embodiment, a relationship of $\lambda_1 < \lambda_3 < \lambda_2 < \lambda_4$ is established, and the first light dispersion band $\Delta\Lambda_1$ and the second light dispersion band $\Delta\Lambda_2$ overlap in a common band $\Delta\Lambda_3$ from the third wavelength $\lambda_3$ to the second wavelength $\lambda_2$.

In such a light dispersion unit 10, a transmission wavelength is changed in the light dispersion-available band $\Delta\Lambda_0$ from the first wavelength $\lambda_1$ to the fourth wavelength $\lambda_4$ and is possibly caused to pass through.

Incidentally, as in the present embodiment, in the light dispersion unit 10 that uses the first wavelength variable interference filter 11 and the second wavelength variable interference filter 12, the second reflective film 112 and the third reflective film 121 are arranged to face each other with a prescribed gap in between. For this reason, the second reflective film 112 and the third reflective film 121 function as an interference filter.

More precisely, when light is caused to pass through the light dispersion unit 10, light with a target wavelength has to pass through the interference filter that is configured with the first wavelength variable interference filter 11, the second wavelength variable interference filter 12, and the second reflective film 112 and the third reflective film 121.

Figure 3:
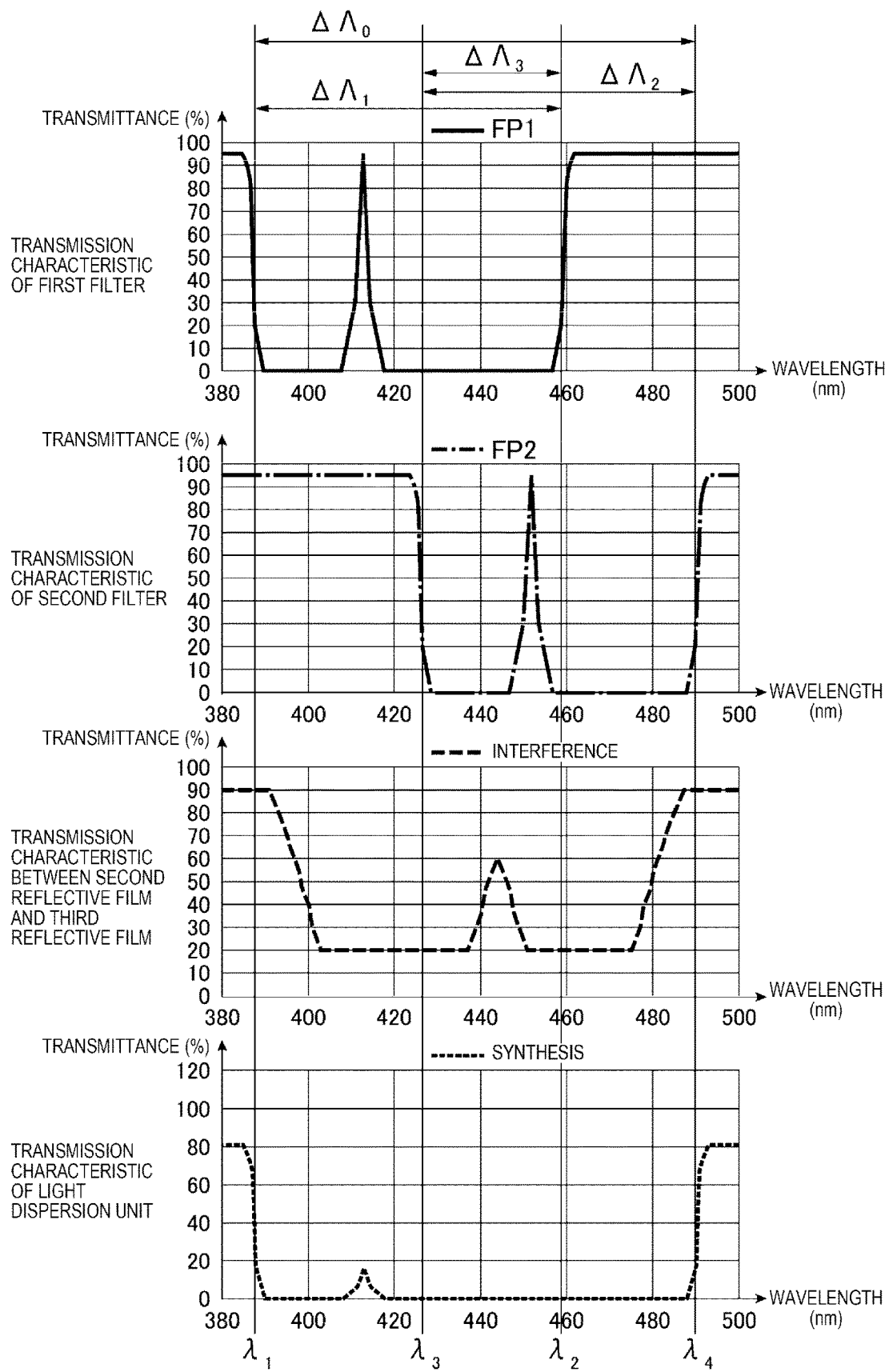
Figure 4:
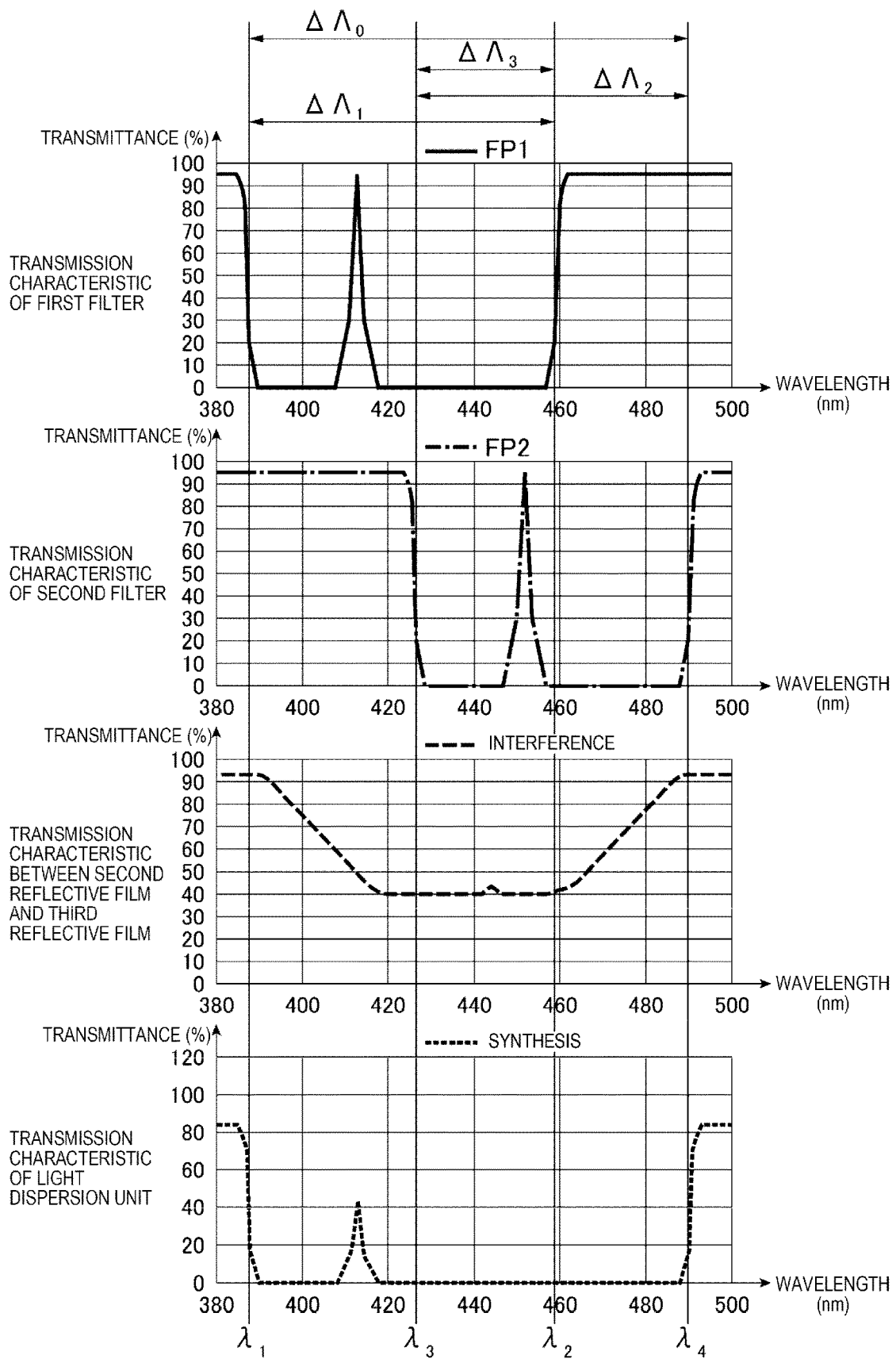
Figure 5:
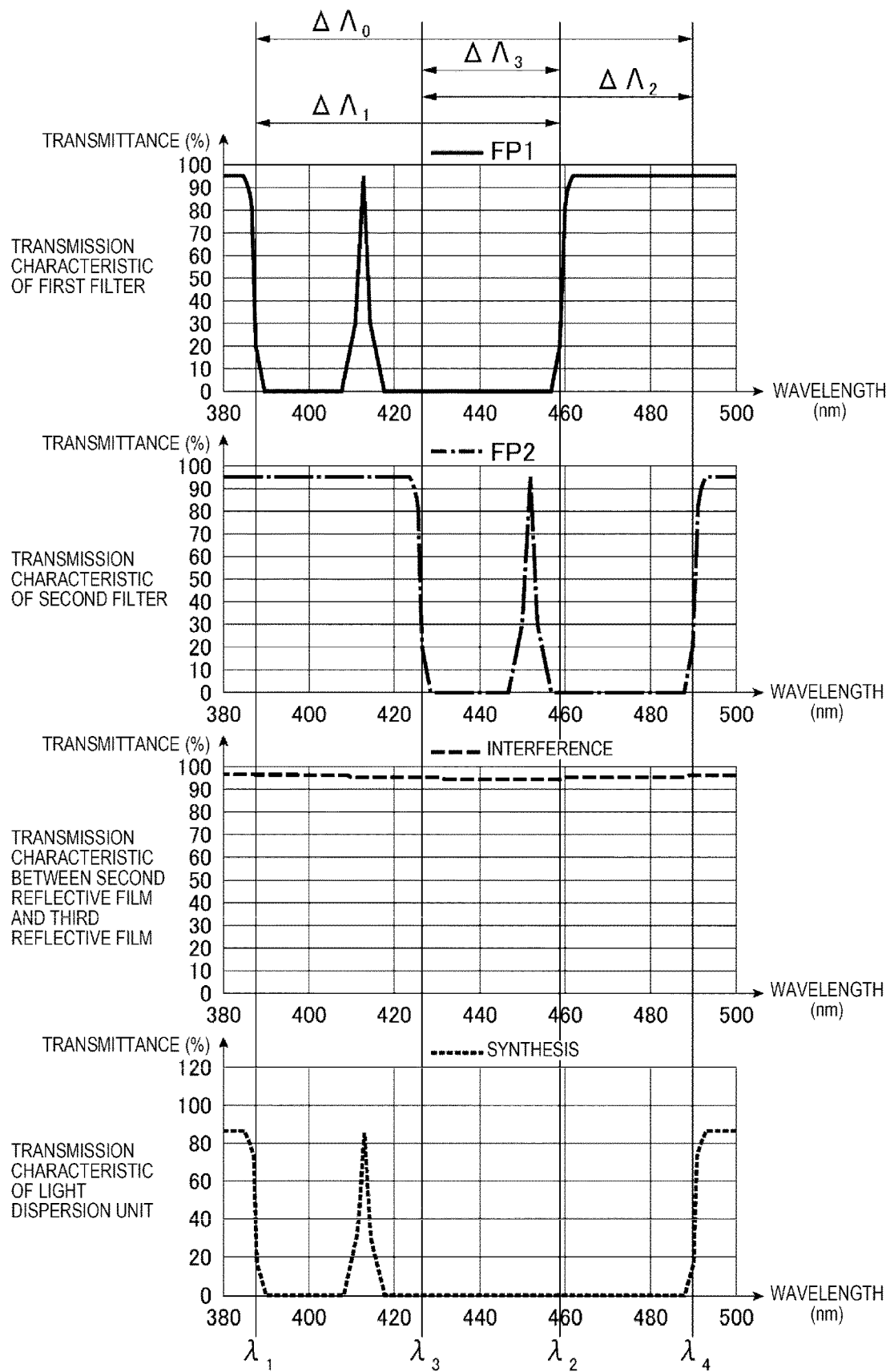
FIG. 5 is a diagram illustrating the transmission characteristic of the light dispersion unit according to the first embodiment.

FIGS. 3 to 5 are diagrams each illustrating transmittance for the light with the target wavelength that pass through the light dispersion unit 10, when the first wavelength variable interference filter 11 and the second wavelength variable interference filter 12 are arranged on the optical axis and where a distance d between the second reflective film 112 and the third reflective film 121 is changed in three patterns.

An example in each of FIGS. 3 and 4 is an example when, for example, the second reflective film 112 and the third reflective film 121 are brought into contact with each other with a film-shaped connection film in between. A thickness of the connection film in FIG. 4 is great compared with that in FIG. 3. On the other hand, FIG. 5 illustrates a transmission characteristic of the light dispersion unit 10 according to the present embodiment.

As illustrated in FIGS. 3 to 5, when the second reflective film 112 and the third reflective film 121 are brought into contact with each other with the film-shaped connection film in between, and so forth, and thus where the distance d between the second reflective film 112 and the third reflective film 121 is short, the second reflective film 112 and the third reflective film 121 function as the interference filter. More precisely, light with a wavelength $\lambda_A$ in accordance with the distance d between the second reflective film 112 and the third reflective film 121 passes through at high transmittance, but transmittance for any other wavelength decrease.

On this occasion, when a target wavelength is different from the wavelength $\lambda_A$, the interference filter that is configured with the second reflective film 112 and the third reflective film 121 is caused to pass through at low transmittance. For example, when a target wavelength is set to be ranged from the first wavelength $\lambda_1$ to the third wavelength $\lambda_3$, the first transmission wave that passes through the first wavelength variable interference filter 11 is set to the target wavelength, and the second transmission wavelength that passes through the second wavelength variable interference filter 12 is set to a prescribed wavelength that is included in the common band $\Delta\Lambda_3$. In this case, the light with the target wavelength is caused to pass through the first wavelength variable interference filter 11 and the second wavelength variable interference filter 12. However, as illustrated in FIG. 3, in a configuration in which the second reflective film 112 and the third reflective film 121 are brought into contact with each other with the connection film in between, transmittance of the interference filter that is configured with the second reflective film 112 and the third reflective film 121 decreases for the light with the target wavelength. For this reason, as illustrated in FIG. 3, transmittance of the light dispersion unit 10 for the light with the target wavelength decreases as well. Consequently, precision of measurement in the spectrometric apparatus 1 is low as well, without obtaining transmission light with desired optical intensity from the light dispersion unit 10.

The distance d between the second reflective film and the third reflective film is longer in the case of FIG. 4 than in the case of FIG. 3. Because of this, the transmittance of the light dispersion unit 10 for the light with the target wavelength is high compared with the example in FIG. 3, but the transmittance of the light dispersion unit 10 for the light with the target wavelength cannot be sufficiently increased.

In contrast with this, in the present embodiment, the first wavelength variable interference filter 11 is provided to face the first surface 101A of the first substrate 101, and the second wavelength variable interference filter 12 is provided to face the second surface 101B. With such a configuration, the distance between the second reflective film 112 and the third reflective film 121 can be increased sufficiently compared with the case where the second reflective film 112 and the third reflective film 121 are brought into contact with each other the connection film in between. More precisely, in the present embodiment, d>G1 and d>G2 are satisfied.

For this reason, as illustrated in FIG. 5, transmittance is increased for all regions in the light dispersion-available band $\Delta\Lambda_0$, in terms of the transmission characteristic of each of the second reflective film 112 and the third reflective film 121. For this reason, the transmittance of the light dispersion unit 10 for the target wavelength can be increased.

It is noted that, in order to bring the second reflective film 112 and the third reflective film 121 into contact with each other with the connection film in between and to obtain the transmission characteristic as illustrated in FIG. 5, it is also considered that the thickness of the connection film is increased. However, the more the thickness of the connection film increased, the more film stress of the connection film is increased. Because of this, due to the film stress, deflection, warp, or the like occurs to the second reflective film 112 or the third reflective film 121. In this case, in terms of the transmission characteristic of the first wavelength variable interference filter 11 or the second wavelength variable interference filter 12, a half-value width of peak light is increased, and wavelength resolution is decreased. More precisely, precision of spectral measurement decreases when the spectrometric apparatus 1 performs spectroscopic measurement.

Figure 6:
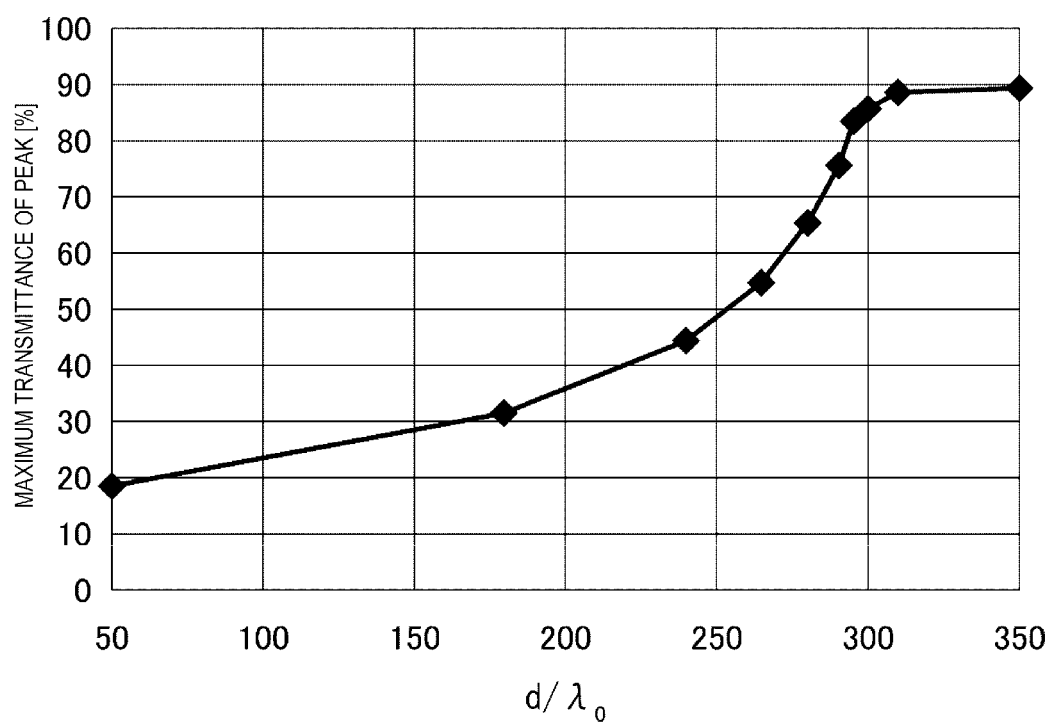
FIG. 6 is a diagram illustrating a change in transmittance for light with a target wavelength that is caused to pass through a light dispersion unit, which results when changing a distance between the second reflective film and the third reflective film.

FIG. 6 is a diagram illustrating a change in the transmittance for the light with the target wavelength that is caused to pass through the light dispersion unit 10, which results when changing the distance d between the second reflective film 112 and the third reflective film 121. As illustrated in FIG. 6, when the center wavelength in the light dispersion-available band $\Delta\Lambda_0$ for the light dispersion unit 10 is set to $\lambda_0$ and $d/\lambda_0$ is changed, as a value of $d/\lambda_0$ is increased, the transmittance for the light with the target wavelength is increased. Then, when $d/\lambda_0 \geq 300$, the transmittance is maximized and is almost at a fixed value.

Figure 7:
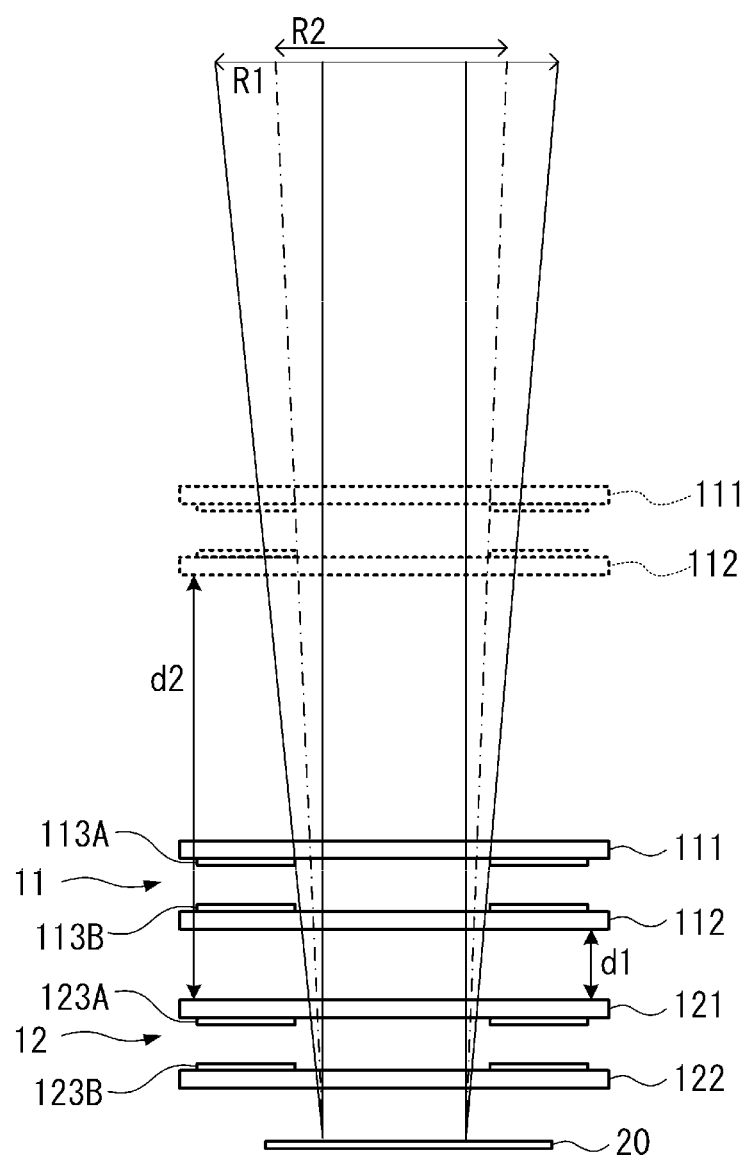
FIG. 7 is a diagram for describing a range of measuring light that is taken in by the light dispersion unit.

FIG. 7 is a diagram for describing a range of measuring light that is taken in by the light dispersion unit 10.

As described above, when the distance d between the second reflective film 112 and the third reflective film 121 is increased, an influence of interference due to the second reflective film and the third reflective film.

However, as illustrated in FIG. 7, when the distance d between the second reflective film 112 and the third reflective film 121 is increased from d1 to d2, the range of measuring light that is taken in by the light dispersion unit 10 is decreased from R1 to R2. More precisely, when the distance d between the second reflective film 112 and the third reflective film 121 is increased, an amount of light that passes through the light dispersion unit 10 is reduced.

Figure 8:
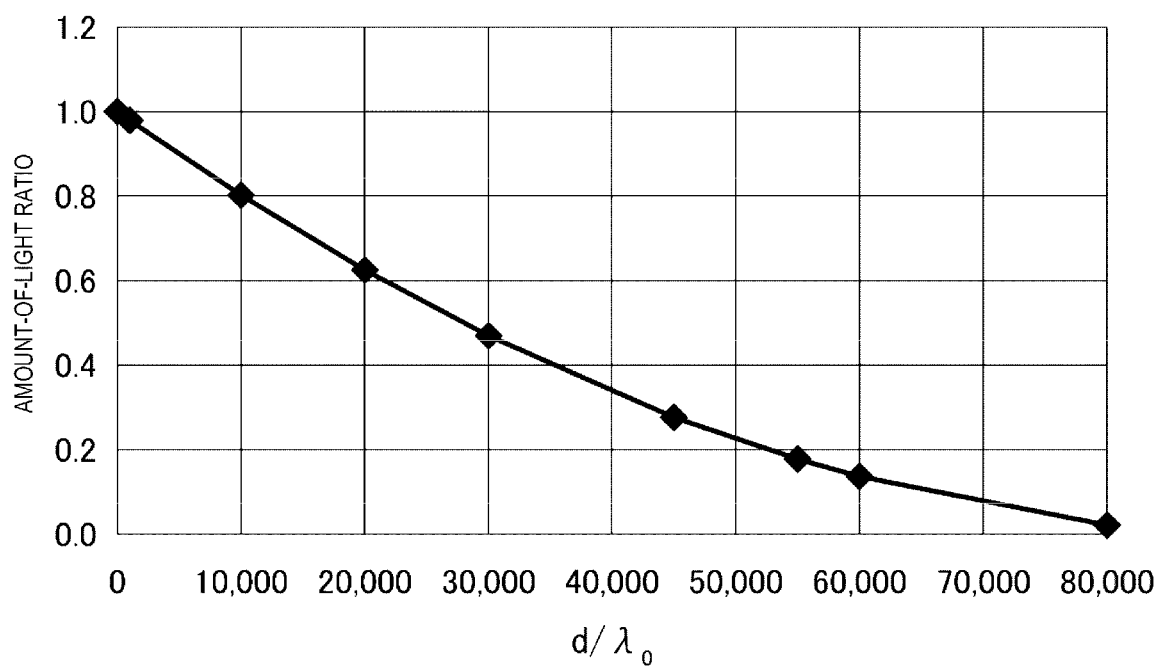
FIG. 8 is a diagram illustrating an amount of received light in a light receiving amount, which results from changing the distance between the second reflective film and the third reflective film.

FIG. 8 is a diagram illustrating an amount of received light in the light receiving unit 20, which results when changing $d/\lambda_0$. In FIG. 8, an amount-of-light ratio is illustrated that is obtained when taking as a reference a case where the distance between the second reflective film 112 and the third reflective film 121 is 0, more precisely, a case where the second reflective film 112 and the third reflective film 121 are brought into contact with each other.

As illustrated in FIG. 8, the amount of light that passes through the light dispersion unit 10 decrease as a value of $d/\lambda_0$ increases. At this point, when spectrometric processing is performed, it is preferable that the amount-of-light ratio that passes through the light dispersion unit 10 is equal to or greater than 0.5. Consequently, $d/\lambda_0$ is preferably equal to or smaller than 30000 and is more preferably equal to or smaller than 500 at which the amount-of-light ratio is equal to or greater than 0.9.

As described above, in the first embodiment, it is preferable that the distance d from the second reflective film 112 to the third reflective film 121, more precisely, a thickness dimension of the substrate from the first surface 101A of the first substrate 101 to the second surface 101B is set to 300 times to 5000 times a center wavelength $\lambda_0$ in the light dispersion-available band $\Delta\Lambda_0$, which is dispersed by the light dispersion unit 10. For example, when the center wavelength $\lambda_0$ is 500 μm, the distance d, more precisely, a thickness of the first substrate 101 is in a range from 150 μm to 15000 μm, more preferably, in a range from 150 μm to 2500 μm. Accordingly, in the light dispersion unit 10, an influence of interference between the second reflective film 112 and the third reflective film 121 can be suppressed, and the light with the target wavelength can be caused to pass through at high transmittance. Furthermore, a decrease in the amount-of-light ratio can also be decreased by lengthening too much the distance from the second reflective film 112 to the third reflective film 121.

Configurations of the Light Receiving Unit 20 and the Circuit Substrate 30

Figure 9:
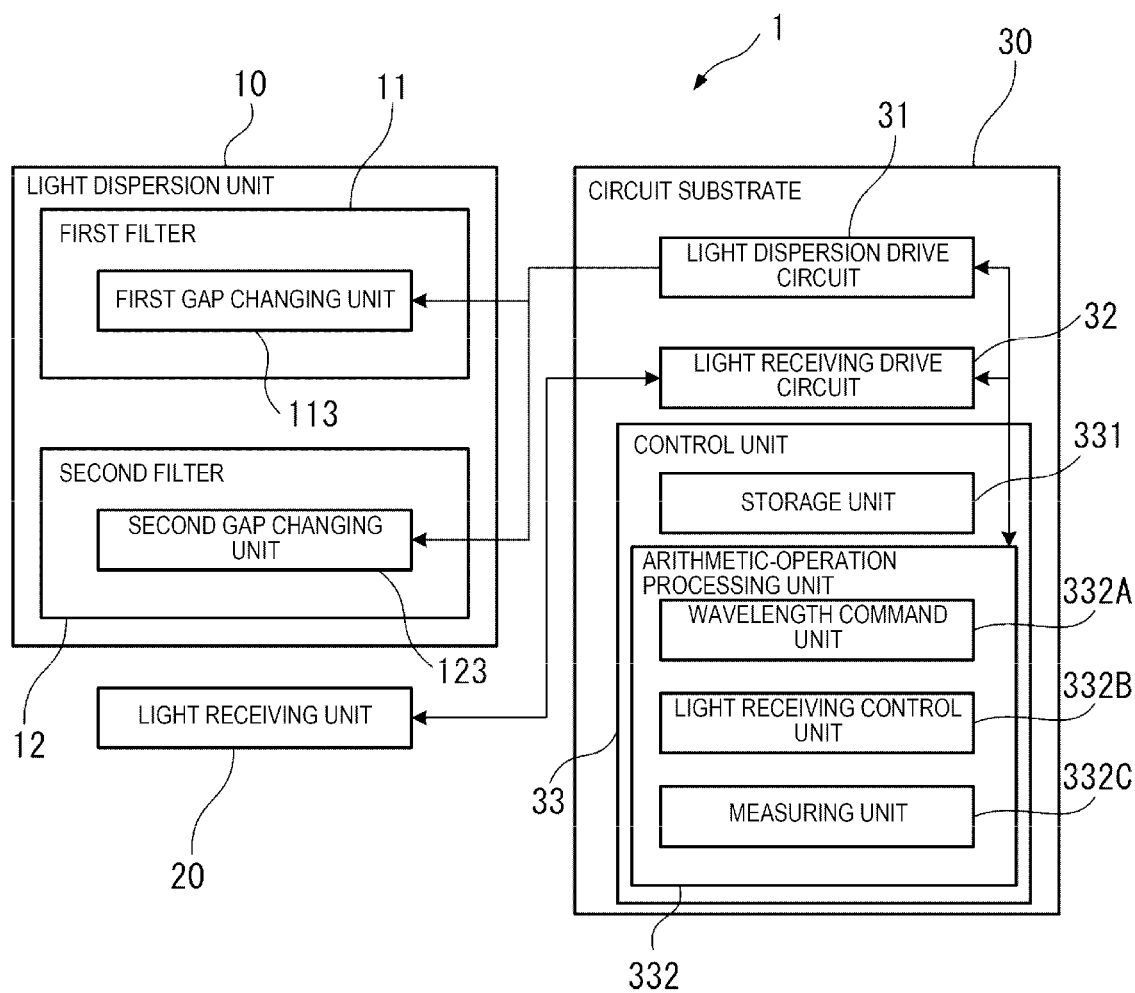
FIG. 9 is a block diagram illustrating a schematic configuration of the spectrometric apparatus according to the first embodiment.

FIG. 9 is a block diagram illustrating a schematic configuration of the spectrometric apparatus 1 according to the present embodiment.

The light receiving unit 20 is a sensor that receives light that passes through the light dispersion unit 10, and is provided in a position on the circuit substrate 30, which overlaps the substrate center-axis $L_c$ of the light dispersion unit 10.

The circuit substrate 30 is a substrate to which the light dispersion unit 10 and the light receiving unit 20 are fixed.

Provided on the circuit substrate 30 is a light dispersion drive circuit 31 that drives the light dispersion unit 10 or a light receiving drive circuit 32 that drives the light receiving unit 20. Furthermore, provided on the circuit substrate 30 is a control unit 33 that is a controller which controls the entire operation of the spectrometric apparatus 1.

The control unit 33, as illustrated in FIG. 9, is configured to include a storage unit 331, an arithmetic-operation processing unit 332, and others.

The storage unit 331 is configured with a memory in which data is stored, or the like. Are stored in the storage unit 331, a first driving table for controlling the first wavelength variable interference filter 11, a second driving table for controlling the second wavelength variable interference filter 12, and others.

The first driving table contains pieces of data on a drive voltage that is applied to the first gap changing unit 113 and on a relationship with the first transmission wavelength. The second driving table contains pieces of data on a drive voltage that is applied to the second gap changing unit 123 and on a relationship with the second transmission wavelength.

The arithmetic-operation processing unit 332 functions a wavelength command unit 332A, a light receiving control unit 332B, a measuring unit 332C and others.

The wavelength command unit 332A controls the light dispersion unit 10 and thus changes a wavelength of transmission light that passes through the light dispersion unit 10.

The light receiving control unit 332B drives the light receiving unit 20 and receives a reception signal that is output from the light receiving unit 20.

The measuring unit 332C computes a result of measuring a measuring target based on the reception signal. For example, the measuring unit 332C measures an optical spectrum of the measuring target or calculates chromaticity of the measuring target and thus performs color measurement.

Method of Driving the Spectrometric Apparatus 1

Next, a method of driving the spectrometric apparatus 1 as described above will be described.

Figure 10:
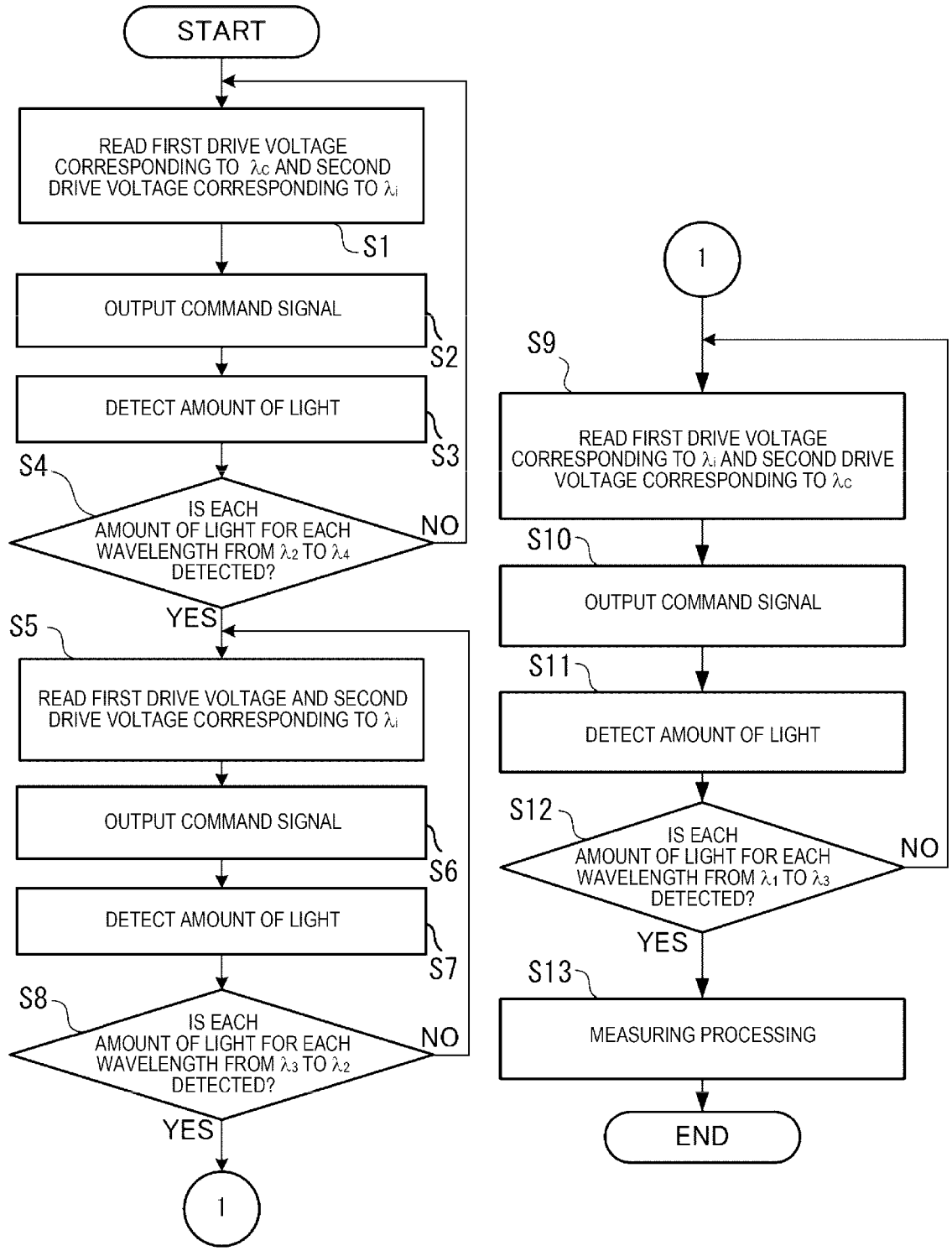
FIG. 10 is a block chart illustrating a method of driving the spectrometric apparatus according to the first embodiment.

FIG. 10 is a flowchart illustrating a method of driving the spectrometric apparatus 1.

The control unit 33 has an operation unit (which is omitted from the figure) or an interface that possibly communicate with an external apparatus. Then, when an operation signal that commands spectroscopic measurement is received by a user operating the operation unit, or when a request signal that requests the spectroscopic measurement is received from an external apparatus, the control unit 33 causes the spectrometric apparatus 1 to performs the spectrometric measurement. In the present embodiment, the spectrometric apparatus 1 measures the amount of light with a wavelength for every prescribed wavelength spacing, which is included in the light dispersion-available band $\Delta\Lambda_0$, and obtains a result of the spectroscopic measurement.

For doing this, first, the wavelength command unit 332A of the control unit 33 performs the spectroscopic measurement on a wave region in the light dispersion-available band $\Delta\Lambda_0$, which does not overlap the first light dispersion band $\Delta\Lambda_2$ in the second light dispersion band $\Delta\Lambda_2$, more precisely, a wavelength region from the second wavelength $\lambda_2$ to the fourth wavelength $\lambda_4$.

Specifically, in Step S1, the wavelength command unit 332A reads a drive voltage that is to be applied to each of the first gap changing unit 113 and the second gap changing unit 123, from a driving table. In Step S1, the wavelength command unit 332A reads a first drive voltage that corresponds to a common band center wavelength $\lambda_c$ in the common band $\Delta\Lambda_3$, from the first driving table. Furthermore, the wavelength command unit 332A reads a second drive voltage that corresponds to a target wavelength $\lambda_i$, from the second driving table.

Next, in Step S2, the wavelength command unit 332A outputs a command signal that is based on the drive voltage which is read, to the light dispersion drive circuit 31. In Step S2, the first drive voltage is applied from the light dispersion drive circuit 31 to the first gap changing unit 113, and the second drive voltage is applied from the light dispersion drive circuit 31 to the second gap changing unit 123.

Figure 11:
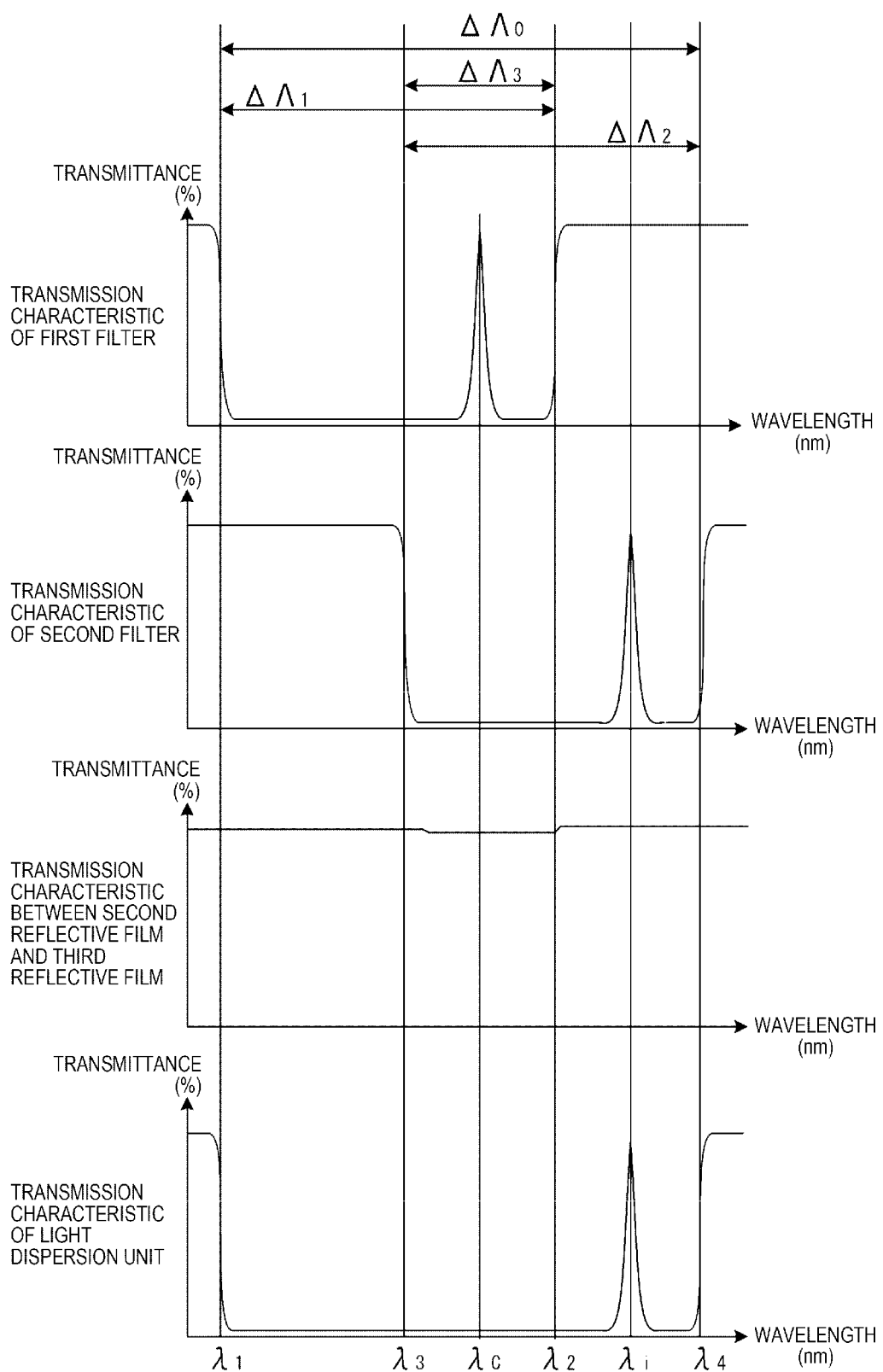
FIG. 11 is a diagram illustrating the transmission characteristic of the light dispersion unit when light with a target wavelength that is included in a wavelength region from a second wavelength to fourth wavelength is caused to pass through the light dispersion unit, in the first embodiment.

FIG. 11 is a diagram illustrating the transmission characteristic of the light dispersion unit 10 when light with a prescribed wavelength that is included in the wavelength region from the second wavelength $\lambda_2$ to the fourth wavelength $\lambda_4$ is caused to pass through the light dispersion unit 10.

In Step S2, as illustrated in FIG. 11, light with the target wavelength $\lambda_i$ passes through the first wavelength variable interference filter 11 and the second wavelength variable interference filter 12 at high transmittance. On the other hand, for a wavelength other than the target wavelength $\lambda_i$, in the light dispersion-available band $\Delta\Lambda_0$, any of the first wavelength variable interference filter 11 and the second wavelength variable interference filter 12 decreases in transmittance. Moreover, light with a wavelength other than that in the light dispersion-available band $\Delta\Lambda_0$ is blocked by the cut filter 14.

Then, in the present embodiment, the second reflective film 112 and the third reflective film 121 each have the thickness dimension of the first substrate 101 and have a dimension of 300 times or more the center wavelength $\lambda_0$. For this reason, when an interference filter is configured with the second reflective film 112 and the third reflective film 121, transmittance for the light with the target wavelength $\lambda_i$ is also high. Therefore, the light with the target wavelength $\lambda_i$ which passes through each of the first wavelength variable interference filter 11, the second wavelength variable interference filter 12, and the second reflective film 112 and the third reflective film 121, is high in transmittance, and thus is possibly caused to pass through the light dispersion unit 10 at high transmittance.

Subsequent to Step S2, the light receiving control unit 332B performs Step S3, drives the light receiving unit 20, and thus detects an amount of light that is light-received in the light receiving unit 20.

Thereafter, the control unit 33 performs Step S4 and determines whether or not the amount of light with all measuring wavelengths, which is included in a wavelength region (the wavelength region from the second wavelength $\lambda_2$ to the fourth wavelength $\lambda_4$) other than that in the first transmission wavelength $\Delta\Lambda_1$ of the light dispersion-available band $\Delta\Lambda_0$. In a case where a result of the determination in Step S4 is No, a change from the target wavelength $\lambda_i$ to the next wavelength occurs, and returning to Step S1 takes place. More precisely, in the present embodiment, the target wavelength $\lambda_1$ is changed at a prescribed interval, and thus processing operations in Steps S1 to S3 are repeatedly performed and each amount of light for each wavelength is detected.

In a case where a result of the determination in Step S4 is Yes, the wavelength command unit 332A of the control unit 33 performs the spectroscopic measurement on the common band $\Delta\Lambda_3$ of the light dispersion-available band $\Delta\Lambda_0$, in which the second light dispersion band $\Delta\Lambda_2$ and the first light dispersion band $\Delta\Lambda_1$ overlap, more precisely, a wavelength region from the third wavelength $\lambda_3$ to the second wavelength $\lambda_2$. Specifically, in Step S5, the wavelength command unit 332A reads the first drive voltage that corresponds to the target wavelength $\lambda_i$, from the first driving table, and reads the second drive voltage that corresponds to the target wavelength $\lambda_i$, from the second driving table.

Then, subsequent to Step S6, the wavelength command unit 332A applies the first drive voltage to the first gap changing unit 113 and outputs the light dispersion drive circuit 31 a command signal to the effect that the second drive voltage is applied to the second gap changing unit 123.

Figure 12:
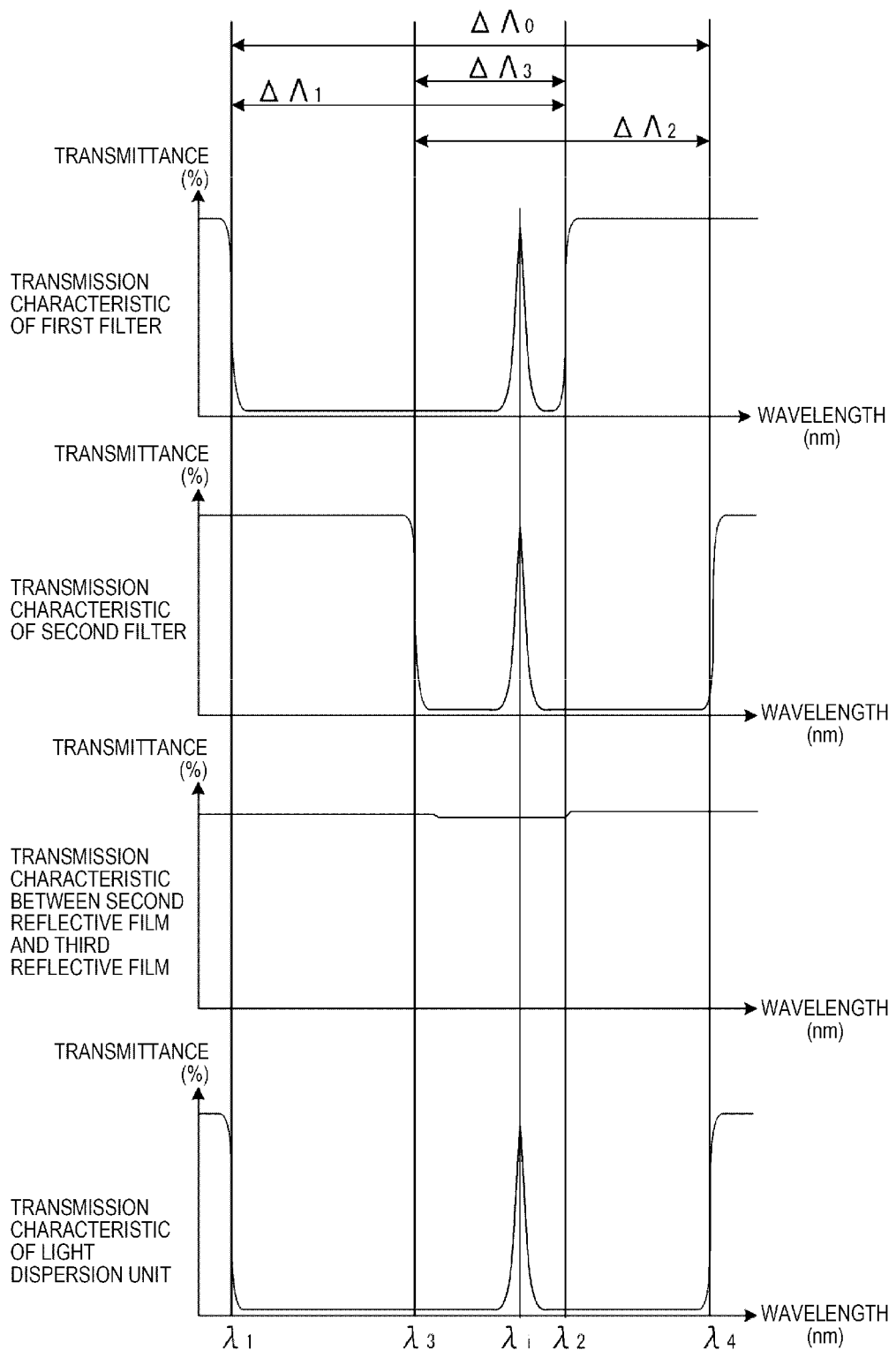
FIG. 12 is a diagram illustrating the transmission property of the light dispersion unit when the light with the target wavelength that is included in a wavelength region from a third wavelength to the second is caused to pass through the light dispersion unit, in the first embodiment.

FIG. 12 is a diagram illustrating the transmission characteristic of the light dispersion unit 10 when light with a prescribed wavelength that is included in the wavelength region from the third wavelength $\lambda_3$ to the second wavelength $\lambda_2$ is caused to pass through the light dispersion unit 10.

As illustrated in FIG. 12, in the light dispersion-available band $\Delta\Lambda_0$, the light with the target wavelength $\lambda_i$ passes through the first wavelength variable interference filter 11 and the second wavelength variable interference filter 12 at high transmittance, and transmittance for light with a wavelength other than the target wavelength $\lambda_i$ decreases in the first wavelength variable interference filter 11 and the second wavelength variable interference filter 12. Furthermore, when the interference filter is configured with the second reflective film 112 and the third reflective film 121, the transmittance for the light with the target wavelength $\lambda_i$ is high.

Therefore, in Step S6, the light with the target wavelength $\lambda_i$ which passes through each of the first wavelength variable interference filter 11, the second wavelength variable interference filter 12, and the second reflective film 112 and the third reflective film 121, is high in transmittance, and thus is caused to pass through the light dispersion unit 10 at high transmittance.

Thereafter, processing in Step S7 is performed. In Step S7, in the same manner as in Step S3, the light receiving control unit 332B drives the light receiving unit 20, and thus detects an amount of light that passes through the light dispersion unit 10 in Step S6.

Then, the control unit 33 performs Step S8. In Step S8, the control unit 33 determines whether or not the amount of light with all measuring wavelengths is detected, which is included in a wavelength region from the common band $\Delta\Lambda_3$ of the light dispersion-available band $\Delta\Lambda_0$ (the wavelength region from the third wavelength $\lambda_3$ to the second wavelength $\lambda_2$). In a case where a result of the determination in Step S8 is No, a change from the target wavelength $\lambda_i$ to the next wavelength occurs, and returning to Step S5 takes place.

In a case where a result of the determination in Step S8 is Yes, the wavelength command unit 332A of the control unit 33 performs the spectroscopic measurement on a wavelength region in the light dispersion-available band $\Delta\Lambda_0$, which does not overlap the second light dispersion band $\Delta\Lambda_2$ of the first light dispersion band $\Delta\Lambda_1$, more precisely, a wavelength region from the first wavelength $\lambda_1$ to the third wavelength $\lambda_3$.

For doing this, in Step S9, the wavelength command unit 332A reads the first drive voltage that corresponds to the target wavelength $\lambda_i$, from the first driving table, and reads the second drive voltage that corresponds to the common band center wavelength $\lambda_c$ in the command band $\Delta\Lambda_3$, from the second driving table.

Next, the wavelength command unit 332A performs Step S10, and outputs the command signal that is based on the drive voltage which is read, to the light dispersion drive circuit 31.

Figure 13:
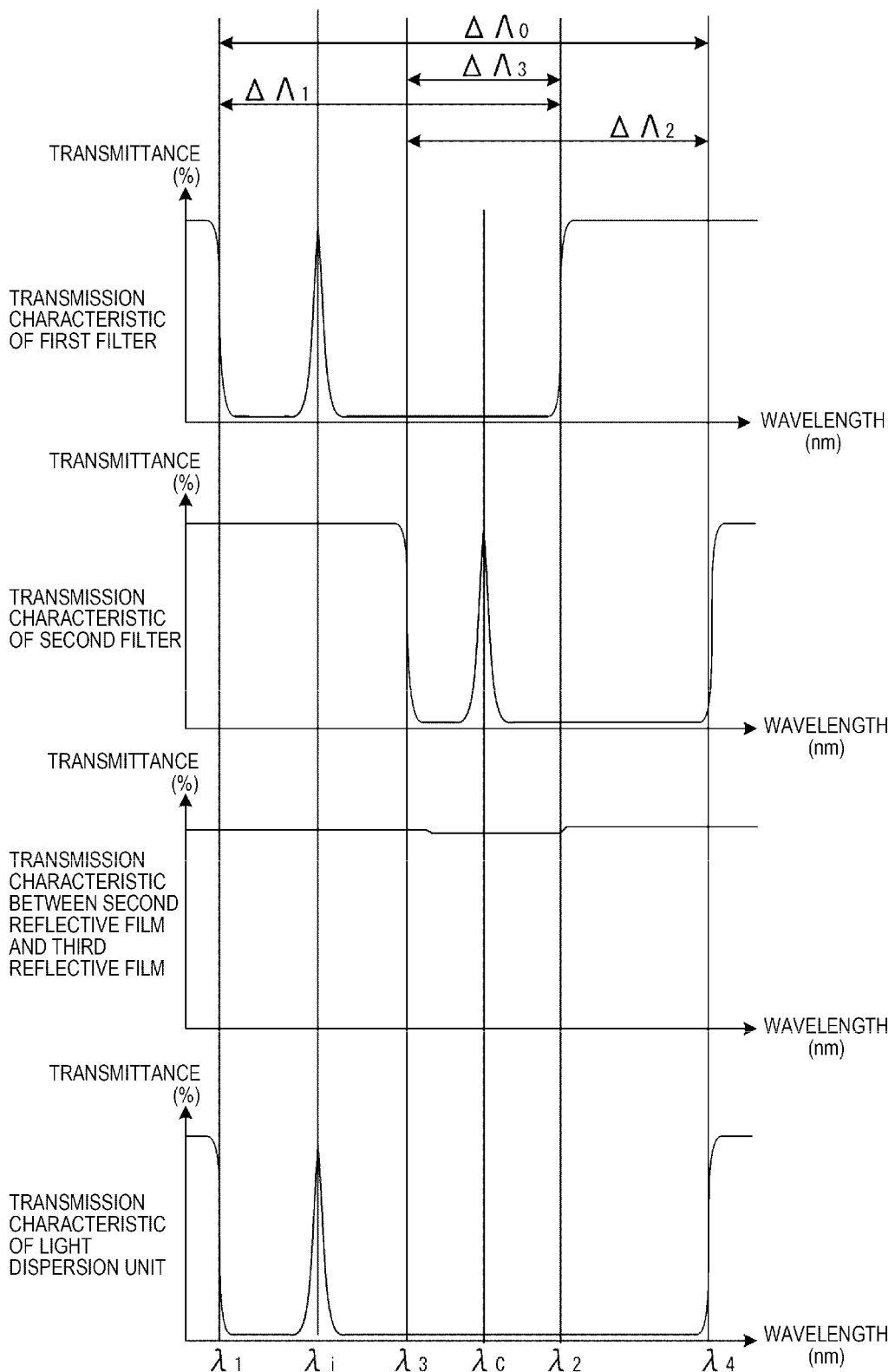
FIG. 13 is a diagram illustrating the transmission property of the light dispersion unit when the light with the target wavelength that is included in a wavelength region from the first wavelength to the third wavelength is caused to pass through the light dispersion unit, in the first embodiment.

FIG. 13 is a diagram illustrating the transmission characteristic of the light dispersion unit 10 when light with a prescribed wavelength that is included in the wavelength region from the first wavelength $\lambda_1$ to the third wavelength $\lambda_3$ is caused to pass through the light dispersion unit 10.

As illustrated in FIG. 13, in the light dispersion-available band $\Delta\Lambda_0$, the light with the target wavelength $\lambda_i$ passes through the first wavelength variable interference filter 11 and the second wavelength variable interference filter 12 at high transmittance, and transmittance for light with a wavelength other than the target wavelength $\lambda_i$ decreases in the first wavelength variable interference filter 11 and the second wavelength variable interference filter 12. Furthermore, when the interference filter is configured with the second reflective film 112 and the third reflective film 121, the transmittance for the light with the target wavelength $\lambda_i$ is high.

Therefore, in Step S10, the light with the target wavelength $\lambda_i$ which passes through each of the first wavelength variable interference filter 11, the second wavelength variable interference filter 12, and the second reflective film 112 and the third reflective film 121, is high in transmittance, and thus is caused to pass through the light dispersion unit 10 at high transmittance.

Furthermore, in Step S11, the light receiving control unit 332B detects an amount of light that passes through the light dispersion unit 10 by driving the light receiving unit 20.

Then, in Step S12, the control unit 33 determines whether or not the amount of light with all measuring wavelengths, which is included in a wavelength region (the wavelength region from the first wavelength $\lambda_1$ to the third wavelength $\lambda_3$) other than that in the second light dispersion band $\Delta\Lambda_2$ of the light dispersion-available band $\Delta\Lambda_0$. In a case where a result of the determination in Step S12 is No, a change from the target wavelength $\lambda_i$ to the next wavelength occurs, and returning to Step S9 takes place.

In a case where a result of the determination in Step S12 is Yes, in Step S13, the measuring unit 332C performs prescribed measuring processing based on the amount of light with each wavelength, which is obtained in each of Steps S3, S7, and S11. For example, the measuring unit 332C calculates an optical spectrum of a measuring target or calculates chromaticity of the measuring target.

Operational Effect of the Present Embodiment

The spectrometric apparatus 1 according to the present embodiment includes the light dispersion unit 10 that is a light dispersion device, and the control unit 33.

Then, the light dispersion unit 10 includes the first wavelength variable interference filter 11, the second wavelength variable interference filter 12, and the first substrate 101.

The first wavelength variable interference filter 11 is a wavelength variable interference filter in which the first reflective film 111 and the second reflective film 112 are arranged to face each other with the first gap G1 in between. In the first wavelength variable interference filter 11, the second reflective film 112 is provided on the first surface 101A of the first substrate 101, and the first reflective film 111 is provided to be opposite in direction to the first substrate 101 with the second reflective film 112 in between.

Furthermore, the second wavelength variable interference filter 12 is a wavelength variable interference filter in which the third reflective film 121 and the fourth reflective film 122 are arranged to face each other with the first gap G2 in between. In the second wavelength variable interference filter 12, the third reflective film 121 is provided on the second surface 101B of the first substrate 101, and the fourth reflective film 122 is provided to be opposite in direction to the first substrate 101 with the third reflective film 121 in between. More precisely, in the light dispersion unit 10 according to the present embodiment, the first substrate 101 having a prescribed thickness dimension is positioned between the second reflective film 112 of the first wavelength variable interference filter 11 and the third reflective film 121 of the second wavelength variable interference filter 12.

In the light dispersion unit 10 with such a configuration, a change from the target wavelength $\lambda_i$ can occur and a wavelength region that is measurable in the spectrometric apparatus 1 can be broadened, in the broad light dispersion-available band $\Delta\Lambda_0$ that includes the first light dispersion band $\Delta\Lambda_1$ for the first wavelength variable interference filter 11 and the second light dispersion band $\Delta\Lambda_2$ for the second wavelength variable interference filter 12.

Furthermore, in the present embodiment, a dimension between the second reflective film 112 and the third reflective film 121 can be increased compared with a case where the second reflective film 112 and the third reflective film 121 are brought into contact with each other with the film-shaped connection film or the like. For this reason, although a configuration is employed in which the second reflective film 112 and the third reflective film 121 faces each other, an influence of interference due to the second reflective film 112 and the third reflective film 121 can be reduced. More precisely, with the second reflective film 112 and the third reflective film 121, a decrease in the transmittance for the light with target wavelength $\lambda_i$ can be suppressed.

Furthermore, in the spectrometric apparatus 1 that includes the light dispersion unit 10, in addition to the broadening of the light dispersion-available band $\Delta\Lambda_0$ being achieved, a reduction in the amount of light with the target wavelength $\lambda_i$ can be suppressed, and high-precision measuring processing that suppresses an influence of a noise component can be performed.

In the light dispersion unit 10 according to the present embodiment, the first wavelength variable interference filter 11 includes the first gap changing unit 113 that is configured with the first electrode 113A provided on the first reflective film 111 and the second electrode 113B provided on the second reflective film 112. Furthermore, the second wavelength variable interference filter 12 includes the second gap changing unit 123 that is configured with the third electrode 123A provided on the third reflective film 121 and the fourth electrode 123B provided on the fourth reflective film 122.

Then, the first through-hole 101C, which passes through the first substrate 101 from the first surface 101A to the second surface 101B, is provided in the first substrate 101, and the second electrode 113B and the third electrode 123A conduct electricity to each other through the first through-hole 101C.

The first gap changing unit 113 or the second gap changing unit 123 is an electrostatic actuator that changes the first gap G1 or the second gap G2 by applying a voltage. In such an electrostatic actuator, generally, one of electrodes in a pair is connected to a reference electric potential circuit, such as a ground circuit, in such a manner to be maintained at a reference electric potential, and a drive signal is input into the other electrode. Accordingly, a difference in electric potential between reference electric potential and a voltage value of a drive signal is applied to the electrostatic actuator, and thus it is possible that electrostatic attraction that acts on the electrostatic actuator is easily changed only by control the voltage value of the drive signal.

In the present embodiment, the second electrode 113B that makes up the first gap changing unit 113 and the third electrode 123A that makes up the second gap changing unit 123 conduct electricity to each other through the first through-hole 101C. With such a configuration, the second electrode 113B and the third electrode 123A can be connected to the reference electric potential circuit provided on the circuit substrate 30, using one wiring line. Consequently, the number of wiring lines to the light dispersion unit 10 can be decreased and thus configuration simplification is achieved.

In the present embodiment, the first wavelength variable interference filter 11 is configured to change a dimension of the first gap G1 and thus to make the first transmission wavelength changeable in the first light dispersion band $\Delta\Lambda_1$ from the first wavelength $\lambda_1$ to the second wavelength $\lambda_2$ that is longer in wavelength than the first wavelength $\lambda_1$. Furthermore, the second wavelength variable interference filter 12 is configured to change the dimension of the second gap G2 and thus to make the second transmission wavelength changeable with a wavelength that is longer than the first wavelength $\lambda_1$, and in the second light dispersion band $\Delta\Lambda_2$ from the third wavelength $\lambda_3$ that is shorter in wavelength than the second wavelength $\lambda_2$ to the fourth wavelength $\lambda_4$ that is longer than the second wavelength $\lambda_2$. More precisely, a relationship of $\lambda_1 < \lambda_3 < \lambda_2 < \lambda_4$ is satisfied.

In such a light dispersion unit 10, when light with from the first wavelength $\lambda_1$ to the third wavelength $\lambda_3$ is dispersed as light with a target wavelength, the first gap G1 is set to a dimension corresponding to the target wavelength, and the second gap G2 is set to a dimension corresponding to an arbitrary wavelength in the common band $\Delta\Lambda_3$. Furthermore, when light with from the third wavelength $\lambda_3$ to the second wavelength $\lambda_2$ is dispersed as light with the target wavelength, both the first gap G1 and the second gap G2 are set to a dimension corresponding to the target wavelength. Moreover, when light with from the second wavelength $\lambda_2$ to the fourth wavelength $\lambda_4$ is dispersed as light with the target wavelength, the first gap G2 is set to the dimension corresponding to the target wavelength, and the first gap G1 is set to the dimension corresponding to the arbitrary wavelength in the common band $\Delta\Lambda_3$.

Accordingly, the light with the target wavelength can be dispersed with high precision can be dispersed in the wide light dispersion-available band $\Delta\Lambda_0$ that includes the first light dispersion band $\Delta\Lambda_1$ and the second light dispersion band $\Delta\Lambda_2$ from the light dispersion unit 10.

In the present embodiment, the distance d between the second reflective film 112 and the third reflective film 121, more precisely, a distance d (the thickness dimension of the first substrate 101) from the first surface 101A of the first substrate 101 to the second surface 101B is 300 times or more the center wavelength $\lambda_0$ in the light dispersion-available band $\Delta\Lambda_0$.

More precisely, when the interference filter is configured with the second reflective film 112 and the third reflective film 121, transmittance for light with prescribed wavelength $\lambda_A$ in accordance with the distance d increases, and transmittance for light with a wavelength other than $\lambda_A$ decreases. Therefore, when the target wavelength of the light that is dispersed in the light dispersion unit 10 is included in a wavelength other than $\lambda_A$, the transmittance for the light with the target wavelength reduces. The transmittance for the light with the target wavelength, as illustrated in FIG. 6, is set to $d/\lambda_0 \geq 300$, and thus can be maintained at approximately 90%. More precisely, in the present embodiment, a disadvantage that light causes multiplex interference between the second reflective film 112 and the third reflective film 121 is suppressed, and, when the target wavelength is set to be any wavelength in the light dispersion-available band $\Delta\Lambda_0$, it is also possible that the light with the target wavelength is caused to pass through at high transmittance.

Furthermore, when the distance d between the second reflective film 112 and the third reflective film 121 exceeds 30000 times the center wavelength $\lambda_0$ in the light dispersion-available band $\Delta\Lambda_0$, the amount of light that passes through the light dispersion unit 10 is reduced to half of it or less when compared with a case where the distance between the second reflective film 112 and the third reflective film 121 is set to 0.

In contrast with this, in the present embodiment, the distance d between the second reflective film 112 and the third reflective film 121 is equal to or shorter than 30000 times the center wavelength $\lambda_0$ in the light dispersion-available band $\Delta\Lambda_0$. Accordingly, a disadvantage that the amount of light that passes through the light dispersion unit 10 is reduced can be suppressed.

In the present embodiment, the distance d between the second reflective film 112 and the third reflective film 121 is longer than the first gap G1 that is a distance between the first reflective film 111 and the second reflective film 112 and is longer than the second gap G2 that is a distance between the third reflective film 121 and the fourth reflective film 122. Accordingly, as described above, although the second reflective film 112 and the third reflective film 121 faces each other, the influence of the interference due to the second reflective film 112 and the third reflective film 121 can be reduced and the decrease in the transmittance for the light with target wavelength $\lambda_t$ can be suppressed.

Second Embodiment

Next, a second embodiment will be described.

In the first embodiment described above, a configuration is employed in which both the first wavelength variable interference filter 11 and the second wavelength variable interference filter 12 are provided on one substrate 101. In contrast with this, the second embodiment is different from the first embodiment in that a second substrate on which the first wavelength variable interference filter 11 is provided, and in that a third substrate on which the second wavelength variable interference filter 12 is provided.

It is noted that, in the following description, a configuration that is already described is given the same reference numeral, and that a description thereof is omitted or simplified.

Figure 14:
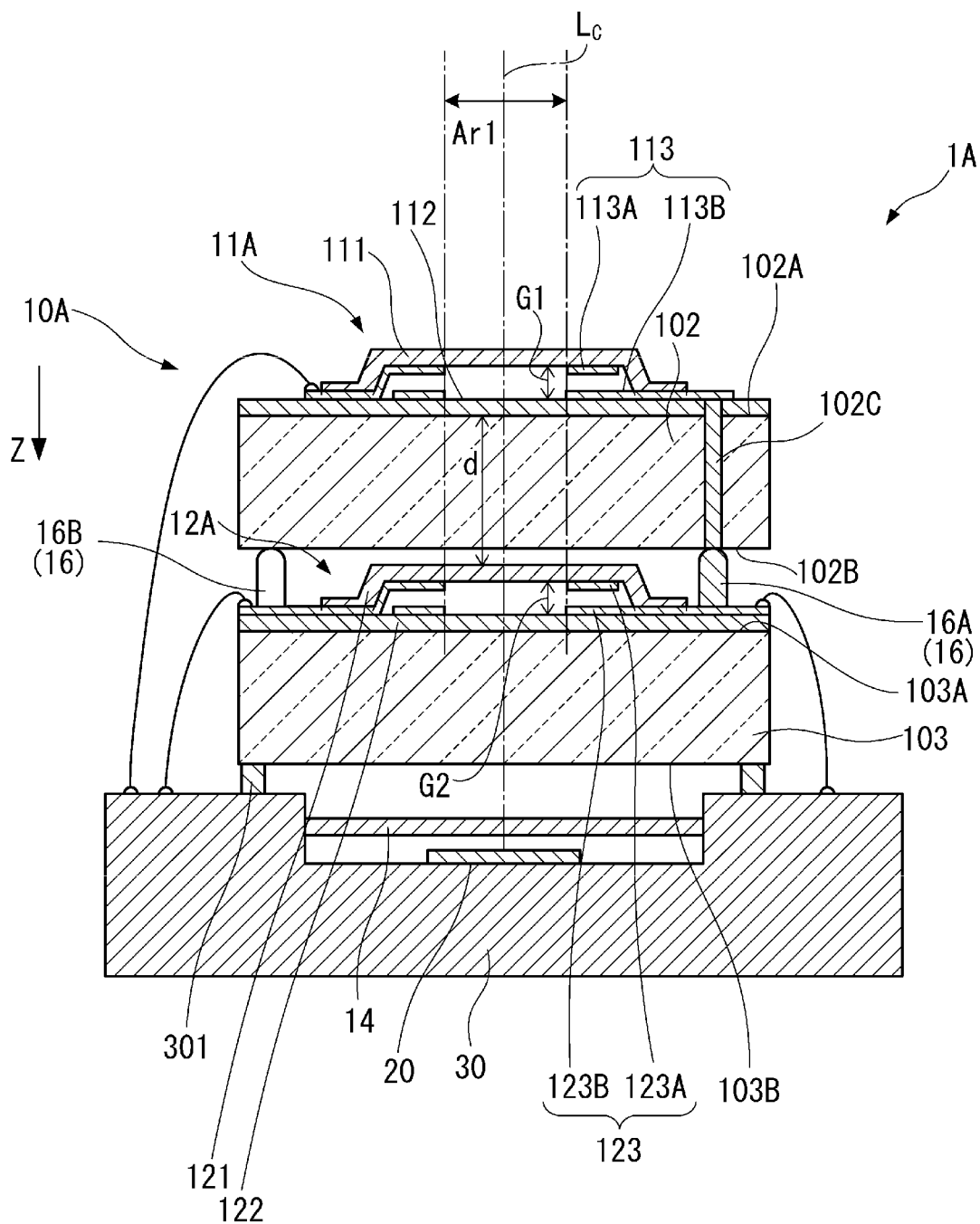
FIG. 14 is a cross-sectional diagram illustrating a schematic configuration of a spectrometric apparatus according to a second embodiment.

FIG. 14 is a cross-sectional diagram illustrating a schematic configuration of a spectrometric apparatus 1A according to the second embodiment. It is noted that the spectrometric apparatus 1A according to the present embodiment uses a spectrometric unit 10A instead of the light dispersion unit 10 of the spectrometric apparatus 1 according to the first embodiment, that a configuration of a light receiving unit or a circuit substrate is approximately the same as that of the light receiving unit 20 or the circuit substrate 30, and that because of this descriptions thereof are omitted here.

The light dispersion unit 10A according to the present embodiment, as illustrated in FIG. 14, includes a second substrate 102, a third substrate 103, a first wavelength variable interference filter 11A, and a second wavelength variable interference filter 12A.

Each of the second substrate 102 and the third substrate 103 is configured with a material having the transmissive property in the light dispersion-available band $\Delta\Lambda_0$, and has approximately the same shape as the first substrate 101. More precisely, the second substrate 102 includes a third surface 102A and a fourth surface 102B that is opposite in direction to the third surface 102A, and is a parallel flat plate of which the third surface 102A and the fourth surface 102B are in parallel with each other. The third substrate 103 includes a fifth surface 103A and a sixth surface 103B that is opposite in direction to the fifth surface 103A, and is a parallel flat place of which the fifth surface 103A and the sixth surface 103B are in parallel with each other.

In the present embodiment, the first wavelength variable interference filter 11A is provided on the second substrate 102, and the second wavelength variable interference filter 12A is provided on the third substrate 103.

Specifically, the first wavelength variable interference filter 11A is configured in such a manner that the second reflective film 112 is provided on the third surface 102A of the second substrate 102, and that the first reflective film 111 is positioned to be opposite in direction to the second substrate 102 with the second reflective film 112 in between. In the same manner as in the first embodiment, the edge portions of the first reflective film 111 are brought into contact with the second reflective film 112, the part of the center portion thereof faces the second reflective film 112 with the first gap G1 in between.

Furthermore, in the same manner as the first embodiment, the first gap changing unit 113, which changes the dimension of the first gap G1, is provided on the first wavelength variable interference filter 11A.

The second wavelength variable interference filter 12A is configured in such a manner that the fourth reflective film 122 is provided on the fifth surface 103A of the third substrate 103, and that the third reflective film 121 is positioned to be opposite in direction to the third substrate 103 with the fourth reflective film 122 in between. Edge portions of the third reflective film 121 are brought into contact with the fourth reflective film 122, a part of the center portion thereof faces the third reflective film 121 with the second gap G2 in between.

Furthermore, in the same manner as the first embodiment, the second gap changing unit 123, which changes the dimension of the second gap G2, is provided on the second wavelength variable interference filter 12A.

Then, in the light dispersion unit 10A according to the present embodiment, the sixth surface 103B of the third substrate 103 faces the circuit substrate 30, and the sixth surface 103B is fixed by the fixation member 301 to the circuit substrate 30. The second substrate 102 is positioned in such a manner that the fourth surface 102B faces the fifth surface 103A of the third substrate 103. A spacer 16 is positioned between the second substrate 102 and the third substrate 103, and, with the spacer 16, the second substrate 102 is fixed with respect to the third substrate 103.

More precisely, a configuration is employed in which the second wavelength variable interference filter 12A is positioned between the second substrate 102 and the third substrate 103. In other words, the second substrate 102 is positioned between the second reflective film 112 of the first wavelength variable interference filter 11A and the third reflective film 121 of the second wavelength variable interference filter 12A.

For this reason, in the same manner as in the first embodiment, in the present embodiment, the distance d between the second reflective film 112 and the third reflective film 121 can be increased compared with a configuration in which the second reflective film 112 and the third reflective film 121 are brought into contact with each other with a connection film. More precisely, the distance d satisfies d>G1 and d>G2. In the same manner as in the first embodiment, the distance d is 300 times or more and 30000 times or less, more preferably, 300 times or more and 5000 times or less the center wavelength $\lambda_0$ of the light dispersion-available band $\Delta\Lambda_0$.

Furthermore, the spacer 16 fixes the second substrate 102 in a prescribed position with respect to the third substrate 103. Multiple spacers 16 may be provided, and a configuration may be employed in which one ring-shaped spacer 16 is provided. In a case where multiple spacers 16 are provided, at least one spacer 16 is defined as a conductive spacer 16A that has a conductive property. It is noted that in a configuration example that is illustrated in FIG. 14, a configuration is illustrated in which multiple spacers 16 are provided and in which the conductive spacer 16A and a fixation spacer 16B that does not have the conductive property are included. In a case where a configuration is employed in which one spacer is provided, the one spacer may be the conductive spacer 16A.

Furthermore, a second through-hole 102C that passes through the second substrate 102 from the third surface 102A to the fourth surface 102B is provided in the second substrate 102.

The second through-hole 102C is provided in a manner that faces the conductive spacer 16A. Then, in the present embodiment, the second electrode 113B of the first gap changing unit 113 conducts electricity to the fourth electrode 123B of the second gap changing unit 123 through the second through-hole 102C and the conductive spacer 16A.

Operational Effect of the Present Embodiment

The light dispersion unit 10A of the spectrometric apparatus 1A according to the present embodiment includes the first wavelength variable interference filter 11A, the second wavelength variable interference filter 12A, the second substrate 102, and the third substrate 103.

The first wavelength variable interference filter 11A is a wavelength variable interference filter in which the first reflective film 111 and the second reflective film 112 are arranged to face each other with the first gap G1 in between. The second reflective film 112 is provided on the third surface 102A of the second substrate 102, and the first reflective film 111 is positioned to be opposite in direction to the second substrate 102 with the second reflective film 112 in between. Furthermore, the second wavelength variable interference filter 12A is a wavelength variable interference filter in which the third reflective film 121 and the fourth reflective film 122 are arranged to face each other with the second gap G2 in between. The fourth reflective film 122 is provided on the fifth surface 103A of the third substrate 103, and the third reflective film 121 is positioned to be opposite in direction to the third substrate 103 with the fourth reflective film 122 in between. Then, with the spacer 16, the second substrate 102 is fixed with respect to the third substrate 103, in such a manner that the fourth surface 102B of the second substrate 102 faces the fifth surface 103A of the third substrate 103. More precisely, in the light dispersion unit 10A according to the present embodiment, the second wavelength variable interference filter 12A is positioned between the second substrate 102 and the third substrate 103, the second substrate 102 is positioned between the second reflective film 112 and the third reflective film 121.

In the light dispersion unit 10A with such a configuration, in the same manner as in the first embodiment, in the broad light dispersion-available band $\Delta\Lambda_0$ that includes the first light dispersion band $\Delta\Lambda_1$ of the first wavelength variable interference filter 11A, and the second light dispersion band $\Delta\Lambda_2$ of the second wavelength variable interference filter 12A, the target wavelength $\lambda_t$ can be changed, and a wavelength region that is measurable in the spectrometric apparatus 1A can be broadened.

Furthermore, because the second substrate 102 is positioned between the second reflective film 112 and the third reflective film 121, a dimension the second reflective film 112 and the third reflective film 121 can be increased compared with a case where the second reflective film 112 and the third reflective film 121 are brought into contact with each other with the film-shaped connection film or the like. For this reason, a disadvantage that the transmittance for the light with the target wavelength decreases due to the second reflective film 112 and the third reflective film 121 can be suppressed.

In the light dispersion unit 10A according to the present embodiment, the first wavelength variable interference filter 11A includes the first gap changing unit 113 that is configured with the first electrode 113A provided on the first reflective film 111 and the second electrode 113B provided on the second reflective film 112.

Furthermore, the second wavelength variable interference filter 12A includes the second gap changing unit 123 that is configured with the third electrode 123A provided on the third reflective film 121 and the fourth electrode 123B provided on the fourth reflective film 122. Furthermore, with the spacer 16 that includes the conductive spacer 16A, the second substrate 102 is fixed with respect to the third substrate 103.

Moreover, the second through-hole 102C that passes through the second substrate 102 from the third surface 102A to the fourth surface 102B is provided on the second substrate 102, and the second electrode 113B and the fourth electrode 123B conduct electricity to each other through the second through-hole 102C and the conductive spacer 16A.

For this reason, with one wiring line, the second electrode 113B and the fourth electrode 123B can be connected to the reference electric potential circuit provided on the circuit substrate 30, and the number of wire lines to the light dispersion unit 10A can be decreased. Because of this, the configuration simplification is achieved.

Third Embodiment

Next, a third embodiment will be described.

In the third embodiment, another example of the configuration of the light dispersion unit uses two substrates is described.

Figure 15:
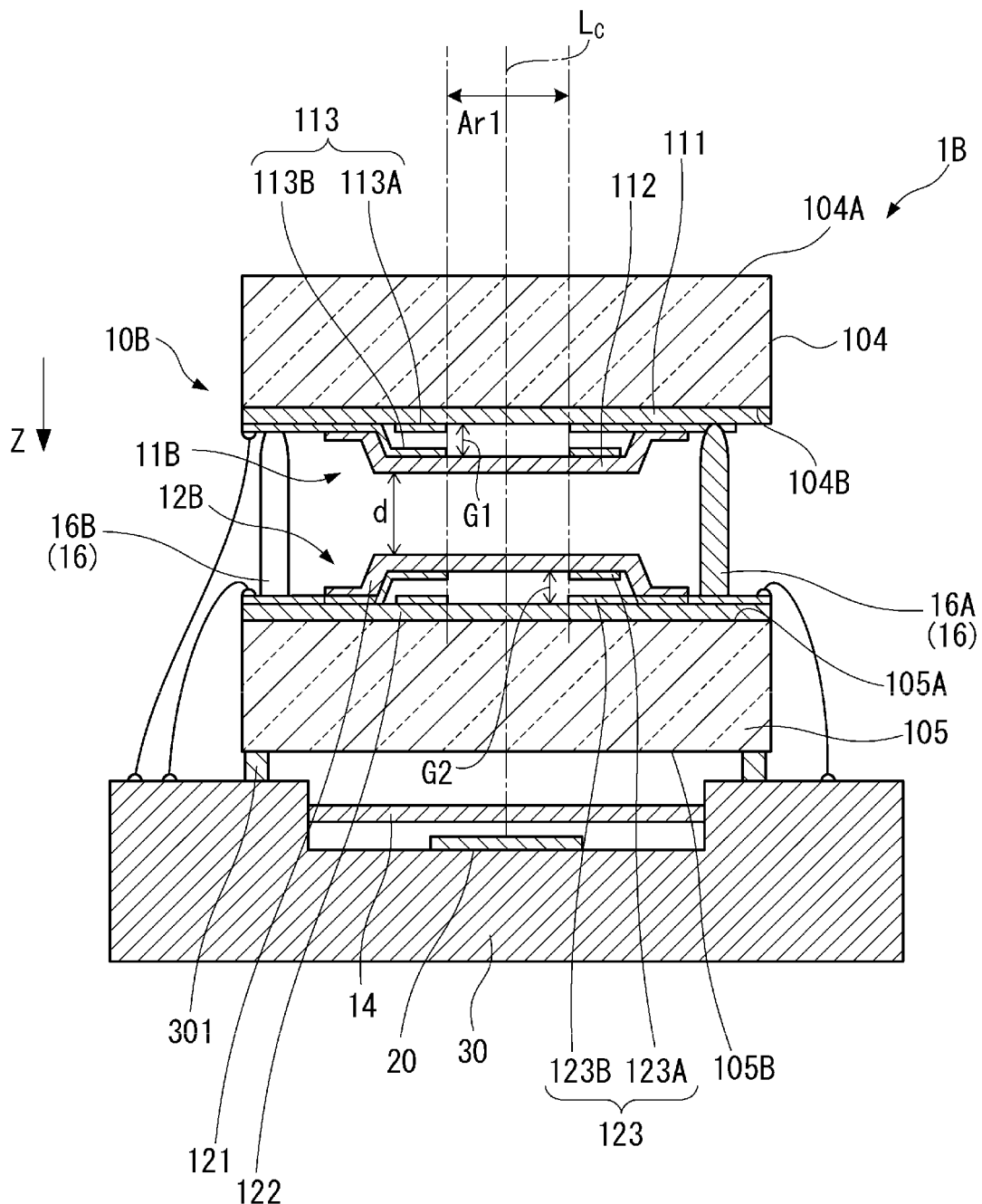
FIG. 15 is a cross-sectional diagram illustrating a schematic configuration of a spectrometric apparatus according to a third embodiment.

FIG. 15 is a cross-sectional diagram illustrating a schematic configuration of a spectrometric apparatus 1B according to the third embodiment. It is noted that the spectrometric apparatus 1B according to the present embodiment uses a light dispersion unit 10B instead of the light dispersion unit 10 of the spectrometric apparatus 1 according to the first embodiment, that a configuration of a light receiving unit or a circuit substrate is approximately the same as that of the light receiving unit 20 or the circuit substrate 30, and that because of this descriptions thereof are omitted here.

The light dispersion unit 10B according to the present embodiment, as illustrated in FIG. 15, includes a fourth substrate 104, a fifth substrate 105, a first wavelength variable interference filter 11B, and a second wavelength variable interference filter 12B.

Each of the fourth substrate 104 and the fifth substrate 105 is configured with a material having the transmissive property in the light dispersion-available band $\Delta\Lambda_0$, and has approximately the same shape as the first substrate 101. More precisely, the fourth substrate 104 includes a seventh surface 104A and an eighth surface 104B that is opposite in direction to the seventh surface 104A, and is a parallel flat plate of which the seventh surface 104A and the eighth surface 104B are in parallel with each other. The fifth substrate 105 includes a ninth surface 105A and a tenth surface 105B that is opposite in direction to the ninth surface 105A, and is a parallel flat plate of which the ninth surface 105A and the tenth surface 105B are in parallel with each other.

In the present embodiment, the first wavelength variable interference filter 11B is provided on the fourth substrate 104, and the second wavelength variable interference filter 12B is provided on the fifth substrate 105.

Specifically, the first wavelength variable interference filter 11B is configured in such a manner that the first reflective film 111 is provided on the eighth surface 104B of the fourth substrate 104, and that the second reflective film 112 is positioned to be opposite in direction to the fourth substrate 104 with the first reflective film 111 in between. Edge portions of the second reflective film 112 are brought into contact with the first reflective film 111, a part of the center portion thereof faces the first reflective film 111 with the first gap G1 in between.

Furthermore, the first gap changing unit 113, which changes the dimension of the first gap G1, is provided on the first wavelength variable interference filter 11B. More precisely, the first electrode 113A is provided on the first reflective film 111, and the second electrode 113B is provided on the second reflective film 112.

The second wavelength variable interference filter 12B is configured in such a manner that the fourth reflective film 122 is provided on the ninth surface 105A of the fifth substrate 105, and that the third reflective film 121 is positioned to be opposite in direction to the fifth substrate 105 with the fourth reflective film 122 in between. Edge portions of the third reflective film 121 are brought into contact with the fourth reflective film 122, a part of the center portion thereof faces the third reflective film 121 with the second gap G2 in between.

Furthermore, in the same manner as the first embodiment, the second gap changing unit 123, which changes the dimension of the second gap G2, is provided on the second wavelength variable interference filter 12B. More precisely, the third electrode 123A is provided on the third reflective film 121, and the fourth electrode 123B is provided on the fourth reflective film 122.

Then, in the light dispersion unit 10B according to the present embodiment, the tenth surface 105B of the fifth substrate 105 faces the circuit substrate 30, and the tenth surface 105B is fixed by the fixation member 301 to the circuit substrate 30. The fourth substrate 104 is positioned in such a manner that the eighth surface 104B faces the ninth surface 105A of the fifth substrate 105. In the same manner as in the second embodiment, the spacer 16 is positioned between the fourth substrate 104 and the fifth substrate 105, and with the spacer 16, the fourth substrate 104 is fixed with respect to the fifth substrate 105.

More precisely, a configuration is employed in which the first wavelength variable interference filter 11B and the second wavelength variable interference filter 12B are arranged between the fourth substrate 104 and the fifth substrate 105.

Unlike in the first embodiment or the second embodiment, in the present embodiment, a substrate is interposed between the second reflective film 112 and the third reflective film 121. However, with the spacer 16, it is possible that a position of the fourth substrate 104 is fixed in a desired position with respect to the fifth substrate 105 and the distance d between the second reflective film 112 and the third reflective film 121 can be determined by the spacer 16. At this point, in the present embodiment, the distance d satisfies d>G1 and d>G2. Furthermore, in the present embodiment, the spacer 16 fixes the fourth substrate 104 with respect to the fifth substrate 105, in such a manner that the distance d between the second reflective film 112 and the third reflective film 121 are 300 times or more and 30000 times or less, more preferably, 300 times or more and 5000 times or less, the center wavelength $\lambda_0$ in the light dispersion-available band $\Delta\Lambda_0$.

Furthermore, in the same manner as in the second embodiment, multiple spacers 16 may be provided and a single spacer 16 may be provided. In an example that is illustrated in FIG. 15, a configuration is illustrated in which the spacer 16 includes the conductive spacer 16A and a fixation spacer 16B that does not have the conductive property.

Then, in the present embodiment, the conductive spacer 16A is provided in such a manner that it is brought into contact with the first electrode 113A and the fourth electrode 123B, and thus the first electrode 113A conducts electricity to the fourth electrode 123B through the conductive spacer 16A.

Operational Effect of the Present Embodiment

The light dispersion unit 10B of the spectrometric apparatus 1B according to the present embodiment includes the first wavelength variable interference filter 11B, the second wavelength variable interference filter 12B, the fourth substrate 104, and the fifth substrate 105.

The first wavelength variable interference filter 11B is a wavelength variable interference filter in which the first reflective film 111 and the second reflective film 112 are arranged to face each other with the first gap G1 in between. The first reflective film 111 is provided on the eighth surface 104B of the fourth substrate 104, and the second reflective film 112 is positioned to be opposite in direction to the fourth substrate 104 with the first reflective film 111 in between. Furthermore, the second wavelength variable interference filter 12B is a wavelength variable interference filter in which the third reflective film 121 and the fourth reflective film 122 are arranged to face each other with the second gap G2 in between. The fourth reflective film 122 is provided on the ninth surface 105A of the fifth substrate 105, and the third reflective film 121 is positioned to be opposite in direction to the fifth substrate 105 with the fourth reflective film 122 in between. Then, with the spacer 16, the fourth substrate 104 is fixed with respect to the fifth substrate 105 in such a manner that the eighth surface 104B of the fourth substrate 104 faces the ninth surface 105A of the fifth substrate 105. More precisely, in the light dispersion unit 10B according to the present embodiment, the configuration is employed in which the first wavelength variable interference filter 11B and the second wavelength variable interference filter 12B are arranged between the fourth substrate 104 and the fifth substrate 105. Then, in the present embodiment, with the spacer 16, the fourth substrate 104 is positioned with respect to the fifth substrate 105. On this occasion, a height dimension of the spacer 16 is selected in such a manner that interference does not occur in the second reflective film 112 and the third reflective film 121. Thus, the disadvantage that the transmittance for the light with the target wavelength decreases due to the second reflective film 112 and the third reflective film 121 can be suppressed.

In the light dispersion unit 10B according to the present embodiment, the first wavelength variable interference filter 11B includes the first gap changing unit 113 that is configured with the first electrode 113A provided on the first reflective film 111 and the second electrode 113B provided on the second reflective film 112. Furthermore, the second wavelength variable interference filter 12B includes the second gap changing unit 123 that is configured with the third electrode 123A provided on the third reflective film 121 and the fourth electrode 123B provided on the fourth reflective film 122.

Then, with the spacer 16 including the conductive spacer 16A, the fourth substrate 104 is fixed with respect to the fifth substrate 105, and the first electrode 113A and the fourth electrode 123B conduct electricity to each other through the conductive spacer 16A.

For this reason, with one wiring line, the first electrode 113A and the fourth electrode 123B can be connected to the reference electric potential circuit provided on the circuit substrate 30, and the number of wiring lines to the light dispersion unit 10B can be decreased. Because of this, the configuration simplification is achieved.

MODIFICATION EXAMPLES

It is noted that the present disclosure is not limited to the embodiments described above and that a modification, an improvement, and so on that fall within a range where the object of the present disclosure can be accomplished are included in the scope of the present disclosure.

Modification Example 1

In the embodiments described above, a configuration is employed in which, as the first wavelength variable interference filters 11, 11A, and 11B, and the second wavelength variable interference filters 12, 12A, and 12B, one of the reflective films in a pair is provided on the substrate, in which the other reflective film is brought into contact with one reflective film of which edge portions are provided on the substrate, and in which a part of the center portion thereof faces to the one reflective film with the cap in between. In contrast with this, both reflective films in a pair are configured to be provided on the substrate, and these substrates are configured to face each other.

Figure 16:
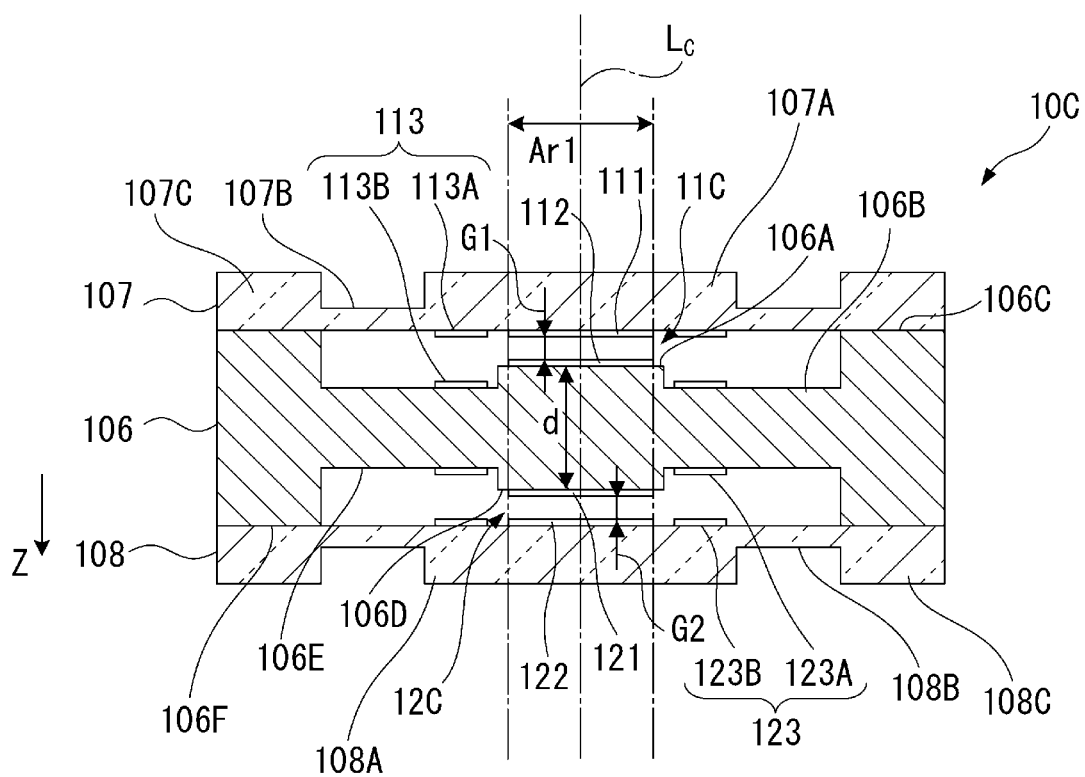
FIG. 16 is a cross-sectional diagram illustrating a schematic configuration of a spectrometric apparatus according to a modification example of the first embodiment.

FIG. 16 is a cross-sectional diagram illustrating an example of a light dispersion unit 10C according to Modification Example 1.

The light dispersion unit 10C that is illustrated in FIG. 16 results from transforming the light dispersion unit 10 according to the first embodiment, and includes a first wavelength variable interference filter 11C, a second wavelength variable interference filter 12C, a sixth substrate 106, a seventh substrate 107, and an eighth substrate 108.

A surface of the sixth substrate 106, which faces the seventh substrate 107, and a surface thereof, which faces the eighth substrate 108, are for front and rear surfaces, respectively. For example, a concave-shaped groove, which is formed by being processed using etching or the like, is provided in the surface facing the seventh substrate 107, and a first positioning surface 106A and second positioning surface 106B that surrounds the first positioning surface 106A are configured with a groove button surface. Furthermore, a portion of the surface facing the seventh substrate 107, in which the groove is not formed, is a first junction surface 106C with which the seventh substrate 107 is brought into contact. In the same manner, for example, a concave-shaped groove, which is formed by being processing using the etching or the like, is provided in the surface facing the eighth substrate 108, and a third junction surface 106D and a fourth junction surface 106E that surrounds the third junction surface 106D are configured with a groove bottom surface. Furthermore, a portion of the surface facing the eighth substrate 108, in which the groove is not formed, is a second junction surface 106F with which the eighth substrate 108 is brought into contact.

The first positioning surface 106A and the third junction surface 106D are for front and rear surfaces, respectively, and the first positioning surface 106A is a surface in parallel with the third junction surface 106D. The second reflective film 112 that makes up the first wavelength variable interference filter 11C is provided on the first positioning surface 106A.

Furthermore, the third reflective film 121 that makes up the second wavelength variable interference filter 12C is provided on the third junction surface 106D.

Furthermore, the second electrode 113B that makes up the first gap changing unit 113 is positioned on the second positioning surface 106B, and the third electrode 123A that makes up the second gap changing unit 123 is positioned on the fourth junction surface 106E.

The seventh substrate 107 has a first movable portion 107A facing the first positioning surface 106A, a first holding portion 107B that holds the first movable portion 107A in a manner that is movable in a Z direction, and a first junction portion 107C that is brought into contact with the first junction surface 106C.

The first movable portion 107A has a flat surface facing the first positioning surface 106A and the second positioning surface 106B, and the first reflective film 111 that makes up the first wavelength variable interference filter 11C is provided on the flat surface. The first reflective film 111 and the second reflective film 112 face each other with the first gap G1 in between. The first electrode 113A is further provided on the first movable portion 107A in a manner that faces the second electrode 113B, and the first gap changing unit 113 is configured with the first electrode 113A and the second electrode 113B.

The first holding portion 107B, for example, is a diaphragm whose surface opposite in direction to the sixth substrate 106 of the seventh substrate 107 is processed by using the etching or the like.

The first junction portion 107C is brought into contact with the first junction surface 106C with a connection film (that is omitted from the figure) in between.

The eighth substrate 108 has approximately the same configuration as the seventh substrate 107, and has a second movable portion 108A facing the third junction surface 106D, a second holding portion 108B that holds the second movable portion 108A in a manner that is movable in the Z direction, and a second junction portion 108C that is brought into contact with the second junction surface 106F.

The second movable portion 108A is a flat surface facing the third junction surface 106D and the fourth junction surface 106E. Provided on the flat surface is the fourth reflective film 122 that makes up the second wavelength variable interference filter 12C in a manner that faces the third reflective film 121. Furthermore, provided on the flat surface is the fourth electrode 123B that makes up the second gap changing unit 123 in a manner that faces the third electrode 123A.

The second holding portion 108B, for example, is a diaphragm whose surface opposite in direction to the sixth substrate 106 of the eighth substrate 108 is processed by using the etching or the like. The second junction portion 108C is brought into contact with the second junction surface 106F with a connection film (that is omitted from the figure) in between.

In such a light dispersion unit 10C, the second reflective film 112 and the third reflective film 121 are also configured to face each other with the sixth substrate 106 in between, and, for example, the distance d between the second reflective film 112 and the third reflective film 121 can also be increased compared with a configuration or the like in which the second reflective film 112 and the third reflective film 121 are brought into contact with each other with the connection film in between. In the same manner as in each of the embodiments described above, the distance d is 300 times or more and 30000 times or less, more preferably, 300 times or more and 5000 times or less the center wavelength $\lambda_0$ of the light dispersion-available band $\Delta\Lambda_0$ for the light dispersion unit 10C. Accordingly, the light with the target wavelength is also caused to pass through the interference filter that is configured with the second reflective film 112 and the third reflective film 121, at high transmittance.

Modification Example 2

In each of the embodiments described above, as the first reflective film 111, the second reflective film 112, the third reflective film 121, and the fourth reflective film 122, an optical multilayer film mirror that is configured by stacking the low-refractive optical layer and the high-refractive optical layer one on top of another, but no limitation to this is imposed. For example, these reflective films may be configured with a metal film made of Ag or the like, or a metal alloy film.

Modification Example 3

In each of the embodiments described above, the example is illustrated in which the first transmission wavelength $\Delta\Lambda_1$ for the first wavelength variable interference filters 11, 11A, and 11B is a wave region from the first wavelength $\lambda_1$ to the second wavelength $\lambda_2$, in which the second light dispersion band $\Delta\Lambda_2$ for the second wavelength variable interference filters 12, 12A, and 12B is a wave region from the third wavelength $\lambda_3$ to the fourth wavelength $\lambda_4$, and in which the relationship of $\lambda_1 < \lambda_3 < \lambda_2 < \lambda_4$ is established.

In contrast with this, for example, the first light dispersion band $\Delta\Lambda_1$ and the second light dispersion band $\Delta\Lambda_2$ may not overlap. In this case, for two types of cut filters each can advance and retreat on optical axes of the light dispersion units 10, 10A, and 10B.

For example, in the light dispersion unit 10 according to the first embodiment, when the first light dispersion band $\Delta\Lambda_1$ and the second light dispersion band $\Delta\Lambda_2$ does not overlap, if the target wavelength is included in the first light dispersion band $\Delta\Lambda_1$, the first gap G1 is set to have a dimension in accordance with the target wavelength, and a cut filter that blocks light other than light in the first light dispersion band $\Delta\Lambda_1$ is inserted on an optical path. Then, when a change from the target wavelength to a wavelength that is included in the second light dispersion band $\Delta\Lambda_2$ occurs, the second gap G2 is set to have the dimension in accordance with the target wavelength, the cut filter that blocks the light other than the light in the first light dispersion band $\Delta\Lambda_1$ is caused to retreat from the optical path, and instead, a cut filter that blocks light other than light in the second light dispersion band $\Delta\Lambda_2$ is inserted on the optical path.

Modification Example 4

In the first embodiment, a configuration is illustrated in which the second electrode 113B and the third electrode 123A conduct electricity to each other with the first through-hole 101C in between. In the second embodiment, a configuration is illustrated in which the second electrode 113B and the fourth electrode 123B conduct electricity to each other with the second through-hole 102C and the conductive spacer 16A in between. Moreover, in the third embodiment, a configuration is illustrated in which the first electrode 113A and the fourth electrode 123B conduct electricity to each other with the conductive spacer 16A in between. In contrast with this, a configuration may be employed in which one of electrodes in a pair that make up the first gap changing unit 113 and one of electrodes in a pair that make up the second gap changing unit 123 are caused to conduct electricity to each other, and the electrode that is caused to conduct electricity is not particularly limited.

For example, in the first embodiment, the second electrode 113B and the fourth electrode 123B may be caused to conduct electricity to each other, the first electrode 113A and the third electrode 123A may be caused to conduct electricity to each other, and the first electrode 113A and the fourth electrode 123B may be caused to have conductivity to each other.

Modification Example 5

In the first embodiment, as a method of driving the spectrometric apparatus 1, the example is illustrated where the target wavelength is caused to change at a prescribed interval in the light dispersion-available band $\Delta\Lambda_0$ and where an amount of light with each target wavelength is measured, but, for example, based on a wavelength-designated signal that is input from an operation unit or an external apparatus, the spectrometric apparatus 1 may be driven in such a manner that light with a specific target wavelength is caused to pass through.

Modification Example 6

In each embodiment, the example is illustrated where the first gap changing unit 113 and the second gap changing unit 123 each have a pair of electrodes and where the first gap G1 or the second gap G2 is caused to change by changing a voltage that is to be applied between the electrodes in the pair, but no limitation to this is imposed.

For example, piezoelectric bodies may be positioned between the first reflective film 111 and the second reflective film 112 and between the third reflective film 121 and the fourth reflective film 122, respectively, and the dimension of the first gap G1 or the second gap G2 may be changed by changing a voltage that is to be applied to the piezoelectric bodies. Furthermore, the dimension of the gap may be changed by changing pressure between reflective layers in a pair.

In addition, a change from a specific structure that is available when the present disclosure is implemented to any other structure or the like can occur in the range where the object of the present disclosure can be accomplished.

What is claimed is:
1. An optical device comprising:
   a first substrate having a transmissive property, the first substrate having a first surface and a second surface outwardly opposite to each other along a first direction;
   a first wavelength variable interference filter including:
      a first reflective film, an entirety of the first reflective film being provided on the first surface of the first substrate; and
      a second reflective film, an entirety of the second reflective film being overlapped and aligned with the first reflective film along the first direction, a periphery area of the second reflective film being stacked on a periphery area of the first reflective film via either a first electrode or a second electrode, a center area of the second reflective film being located above a center area of the first reflective film via a first air gap along the first direction; and
   a second wavelength variable interference filter including:
      a third reflective film, an entirety of the third reflective film being provided on the second surface of the first substrate; and a fourth reflective film, an entirety of the fourth reflective film being overlapped and aligned with the third reflective film along the first direction, a periphery area of the fourth reflective films being stacked on a periphery area of the third reflective film via either a third electrode or a fourth electrode, a center area of the fourth reflective film being located below a center area of the third reflective film via a second air gap along the first direction.

2. The optical device according to claim 1, wherein
the first electrode of the first wavelength variable interference filter is provided on the first reflective film,
the second electrode of the first wavelength variable interference filter is provided on the second reflective film,
the first electrode and the second electrode face each other with the first air gap,
the third electrode of the second wavelength variable interference filter is provided on the third reflective film,
the fourth electrode of the second wavelength variable interference filter is provided on the fourth reflective film,
the third electrode and the fourth electrode face each other with the second air gap, and
the first substrate includes a first through-hole that passes through the first substrate from the first surface to the second surface, and one of the first electrode and the second electrode conducts electricity to one of the third electrode and the fourth electrode through the first through-hole.

3. The optical device according to claim 1, wherein
the first wavelength variable interference filter is configured to change a dimension of the first air gap and thus to make a first transmission wavelength, which is a wavelength of light that is caused to pass through the first wavelength variable interference filter, to be changed in a range from a first wavelength to a second wavelength that is longer in wavelength than the first wavelength, and
the second wavelength variable interference filter is configured to change a dimension of the second air gap and thus to make a second transmission wavelength, which is a wavelength of light that is caused to pass through the second wavelength variable interference filter, to be changed in a range from a third wavelength that is longer in wavelength than the first wavelength and is shorter in wavelength than the second wavelength to a fourth wavelength that is longer in wavelength than the second wavelength.

4. The optical device according to claim 3, wherein
a distance between the first reflective film and the third reflective film is 300 times or more a center wavelength in a wavelength region from the first wavelength to the fourth wavelength.

5. The optical device according to claim 3, wherein
a distance between the first reflective film and the third reflective film is 30000 times or less a center wavelength in a wavelength region from the first wavelength to the fourth wavelength.

6. The optical device according to claim 1, wherein
a distance between the first reflective film and the third reflective film is longer than a distance between the first reflective film and the second reflective film and is longer than a distance between the third reflective film and the fourth reflective film.

7. An electronic apparatus comprising:
an optical device according to claim 1; and
a control unit that controls the optical device.

* * * * *